(12) United States Patent
Kaipu Narahari et al.

(10) Patent No.: US 12,489,563 B2
(45) Date of Patent: Dec. 2, 2025

(54) ASSISTED ACKNOWLEDGEMENT FOR WIRELESS STREAMING

(71) Applicant: QUALCOMM Incorporated, San Diego, CA (US)

(72) Inventors: Skanda Kumar Kaipu Narahari, Bangalore (IN); Sourabh Jana, Bangalore (IN); Nitin Raghavendra Kidiyoor, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 18/306,178

(22) Filed: Apr. 24, 2023

(65) Prior Publication Data
US 2024/0356676 A1  Oct. 24, 2024

(51) Int. Cl.
*H04L 1/18* (2023.01)
*H04L 1/1607* (2023.01)
*H04W 28/04* (2009.01)
*H04W 84/18* (2009.01)

(52) U.S. Cl.
CPC ............... *H04L 1/18* (2013.01); *H04L 1/1607* (2013.01); *H04W 28/04* (2013.01); *H04W 84/18* (2013.01)

(58) Field of Classification Search
None
See application file for complete search history.

(56) References Cited

U.S. PATENT DOCUMENTS

| | | |
|---|---|---|
| 2008/0250293 A1 | 10/2008 | Taori et al. |
| 2012/0008545 A1 | 1/2012 | Zhang et al. |
| 2012/0093061 A1* | 4/2012 | Charbit ............... H04L 1/0034 370/315 |
| 2015/0023185 A1* | 1/2015 | Bodas .................. H04W 52/48 370/252 |
| 2020/0322839 A1* | 10/2020 | Nguyen ................ H04W 4/06 |
| 2023/0088696 A1* | 3/2023 | Back ..................... H04W 40/22 370/315 |
| 2024/0121064 A1* | 4/2024 | Barros .................. H04R 1/1016 |
| 2024/0121550 A1* | 4/2024 | Kumar .................. H04R 1/1016 |
| 2025/0119931 A1* | 4/2025 | Yoo ......................... H04L 47/32 |

OTHER PUBLICATIONS

International Search Report and Written Opinion—PCT/US2024/021286—ISA/EPO—Jul. 10, 2024.

* cited by examiner

*Primary Examiner* — Benjamin Lamont
(74) *Attorney, Agent, or Firm* — Harrity & Harrity, LLP

(57) ABSTRACT

Various aspects of the present disclosure generally relate to wireless communication. In some aspects, an assisting wireless device may track a first retransmission metric that is based on a number of retransmitted packets that the assisting wireless device received from a source device. The assisting wireless device may receive, from a sink wireless device, an acknowledgement assistance request indicating a second retransmission metric for the sink wireless device. The assisting wireless device may transmit, to the sink wireless device, a response to the acknowledgement assistance request based on respective values of the first retransmission metric and the second retransmission metric. Numerous other aspects are described.

24 Claims, 16 Drawing Sheets

ASSISTED ACKNOWLEDGEMENT FOR WIRELESS STREAMING

FIELD OF THE DISCLOSURE

Aspects of the present disclosure generally relate to wireless communication and to techniques and apparatuses associated with assisted acknowledgment for wireless streaming.

BACKGROUND

A wireless personal area network (WPAN) is a short-range wireless network typically established by a user to interconnect various personal devices, sensors, and/or appliances located within a certain distance or area of the user. For example, a WPAN based on a communication protocol such as a Bluetooth® (BT) protocol, a Bluetooth Low Energy protocol, or a Zigbee® protocol may provide wireless connectivity to peripheral devices that are within a specific distance (e.g., 5 meters, 10 meters, 20 meters, 100 meters) of each other. Bluetooth is a short-range wireless communication protocol that supports a WPAN between a central device (such as a host device or a source device) and at least one peripheral device (such as a client device or a sink device). However, power consumption associated with Bluetooth communications that operated on a basic rate (BR) and/or enhanced data rate (EDR) physical layer may render WPAN communication impractical in certain applications.

Accordingly, to address the power consumption challenges associated with Bluetooth BR/EDR (sometimes referred to as a Bluetooth classic or Bluetooth legacy protocol), Bluetooth Low Energy (BLE) (also referred to herein as WPAN LE) was developed and adopted in various applications in which data transfers are relatively infrequent and/or to enable WPAN communication with low power consumption. For example, BLE exploits infrequent data transfer by using a low duty cycle operation and placing one or both of the central device and the peripheral device(s) into a sleep mode between data transmissions, thereby conserving power. Example applications that use BLE include battery-operated sensors and actuators in various medical, industrial, consumer, and fitness applications. BLE may also be used to connect devices such as BLE-enabled smartphones, tablets, laptops, earbuds, or the like. While traditional (or classic) Bluetooth and BLE offer certain advantages, there exists a need for further improvements in Bluetooth and BLE technology. For example, traditional Bluetooth and BLE have a limited range, have a limited data capacity throughput, and are susceptible to interference from other devices communicating in the same frequency band (such as via wireless local area network (WLAN) communications).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description presented later.

Some aspects described herein relate to a method of wireless communication performed by an assisting wireless device. The method may include tracking a first retransmission metric that is based on a number of retransmitted packets that the assisting wireless device received from a source device. The method may include receiving, from a sink wireless device, an acknowledgement assistance request indicating a second retransmission metric for the sink wireless device. The method may include transmitting, to the sink wireless device, a response to the acknowledgement assistance request based on respective values of the first retransmission metric and the second retransmission metric.

Some aspects described herein relate to a method of wireless communication performed by a sink wireless device. The method may include tracking a first retransmission metric that is based on a number of retransmitted packets that the sink wireless device received from a source device. The method may include transmitting, to an assisting wireless device, an acknowledgement assistance request indicating the first retransmission metric tracked by the sink wireless device. The method may include receiving, from the assisting wireless device, a response to the acknowledgement assistance request based on respective values of the first retransmission metric tracked by the sink wireless device and a second retransmission metric tracked by the assisting wireless device.

Some aspects described herein relate to an assisting wireless device for wireless communication. The assisting wireless device may include a memory and one or more processors coupled to the memory. The one or more processors may be configured to track a first retransmission metric that is based on a number of retransmitted packets that the assisting wireless device received from a source device. The one or more processors may be configured to receive, from a sink wireless device, an acknowledgement assistance request indicating a second retransmission metric for the sink wireless device. The one or more processors may be configured to transmit, to the sink wireless device, a response to the acknowledgement assistance request based on respective values of the first retransmission metric and the second retransmission metric.

Some aspects described herein relate to a sink wireless device for wireless communication. The sink wireless device may include a memory and one or more processors coupled to the memory. The one or more processors may be configured to track a first retransmission metric that is based on a number of retransmitted packets that the sink wireless device received from a source device. The one or more processors may be configured to transmit, to an assisting wireless device, an acknowledgement assistance request indicating the first retransmission metric tracked by the sink wireless device. The one or more processors may be configured to receive, from the assisting wireless device, a response to the acknowledgement assistance request based on respective values of the first retransmission metric tracked by the sink wireless device and a second retransmission metric tracked by the assisting wireless device.

Some aspects described herein relate to a non-transitory computer-readable medium that stores a set of instructions for wireless communication by an assisting wireless device. The set of instructions, when executed by one or more processors of the assisting wireless device, may cause the assisting wireless device to track a first retransmission metric that is based on a number of retransmitted packets that the assisting wireless device received from a source device. The set of instructions, when executed by one or more processors of the assisting wireless device, may cause the assisting wireless device to receive, from a sink wireless device, an acknowledgement assistance request indicating a second retransmission metric for the sink wireless device. The set of instructions, when executed by one or more processors of the assisting wireless device, may cause the assisting wireless device to transmit, to the sink wireless device, a response to the acknowledgement assistance request based on respective values of the first retransmission metric and the second retransmission metric.

Some aspects described herein relate to a non-transitory computer-readable medium that stores a set of instructions for wireless communication by a sink wireless device. The set of instructions, when executed by one or more processors of the sink wireless device, may cause the sink wireless device to track a first retransmission metric that is based on a number of retransmitted packets that the sink wireless device received from a source device. The set of instructions, when executed by one or more processors of the sink wireless device, may cause the sink wireless device to transmit, to an assisting wireless device, an acknowledgement assistance request indicating the first retransmission metric tracked by the sink wireless device. The set of instructions, when executed by one or more processors of the sink wireless device, may cause the sink wireless device to receive, from the assisting wireless device, a response to the acknowledgement assistance request based on respective values of the first retransmission metric tracked by the sink wireless device and a second retransmission metric tracked by the assisting wireless device.

Some aspects described herein relate to an apparatus for wireless communication. The apparatus may include means for tracking a first retransmission metric that is based on a number of retransmitted packets that the apparatus received from a source device. The apparatus may include means for receiving, from a sink wireless device, an acknowledgement assistance request indicating a second retransmission metric for the sink wireless device. The apparatus may include means for transmitting, to the sink wireless device, a response to the acknowledgement assistance request based on respective values of the first retransmission metric and the second retransmission metric.

Some aspects described herein relate to an apparatus for wireless communication. The apparatus may include means for tracking a first retransmission metric that is based on a number of retransmitted packets that the apparatus received from a source device. The apparatus may include means for transmitting, to an assisting wireless device, an acknowledgement assistance request indicating the first retransmission metric tracked by the apparatus. The apparatus may include means for receiving, from the assisting wireless device, a response to the acknowledgement assistance request based on respective values of the first retransmission metric tracked by the apparatus and a second retransmission metric tracked by the assisting wireless device.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
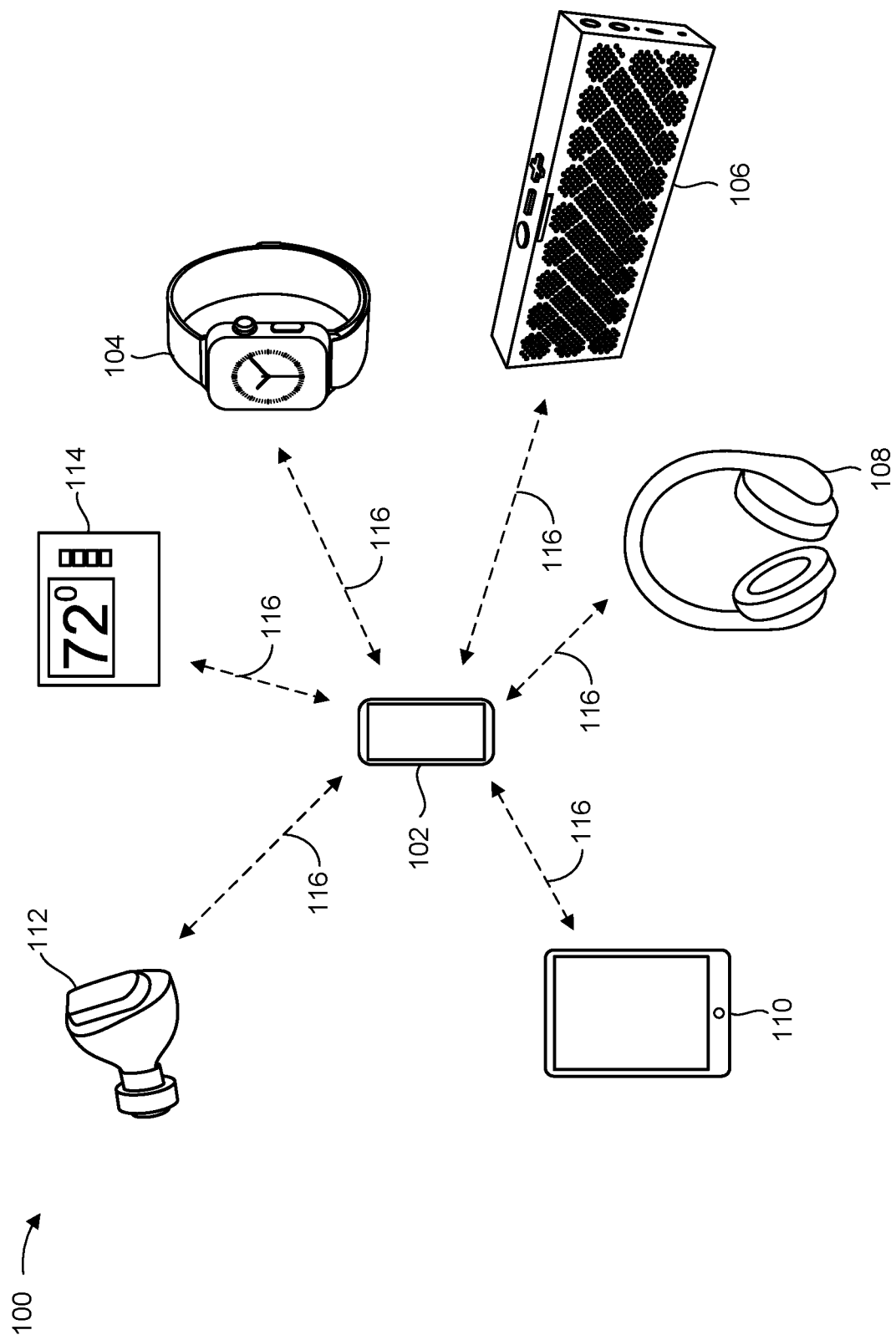
FIG. 1 is a diagram illustrating an example of a wireless personal area network (WPAN), in accordance with the present disclosure.

In a wireless personal area network (WPAN), such as a Bluetooth® (BT) network or a Bluetooth Low Energy (BLE) network, a common use case is wireless audio streaming from a central source device (e.g., a smartphone) to multiple sink devices (e.g., a left earbud and a right earbud). In such use cases and/or other wireless streaming use cases, the central source device may create a connected isochronous stream (CIS) that is used to transmit packets to each sink device, and each sink device may be configured to transmit an acknowledgement to the source device to indicate that a particular packet was successfully received. Accordingly, in cases where the source device does not receive an acknowledgement for a particular packet from a sink device, the source device may retransmit the packet one or more times until the source device receives an acknowledgement for the packet. For example, in a typical audio streaming use case, audio data generally flows in a direction from the source device to the sink devices, and data transmitted by the sink devices is generally limited to acknowledgements that are sent back to the source device to indicate when an audio packet is successfully received.

However, as the distance between the source device and the sink devices increases, there may be a point in time where one or more sink devices are successfully receiving packets from the source device but the source device is not receiving acknowledgements from one or more sink devices. For example, one reason for the source device failing to receive acknowledgements from the sink devices may relate to asymmetry in transmit power levels between the source device and the sink devices, because wireless earbuds or other sink devices typically contain a smaller battery compared to the source device and therefore have a lower maximum transmit power level (e.g., 15 or 19 decibel milliwatts (dBm)). The asymmetry in transmit power levels may effectively limit the overall range that can be achieved between the source device and the sink devices (e.g., when the sink devices are beyond a range where acknowledgements can be received by the source device, the streaming use case may fail because the source device cannot determine whether the sink devices are receiving downlink packets). Furthermore, when the source device is unable to receive acknowledgements that are sent by one or more sink devices, the source device may unnecessarily continue to retransmit packets that were already successfully delivered, which leads to unnecessary bandwidth utilization and power consumption.

Some aspects described herein relate to an assisted acknowledgement mode that may be used to reduce unnecessary retransmissions, conserve bandwidth, conserve power, and/or increase an effective range of a wireless streaming use case. For example, depending on various factors, such as an orientation of the source device and the sink devices, there are various circumstances in which one sink device may be in a better position in an uplink direction to send acknowledgements to the source device. For example, among a pair of wireless earbuds, one earbud may be located farther away from the source device than the other earbud, or there may be one or more obstructions or other sources of interference with uplink transmissions from one earbud that do not impact (or have a lesser impact on) uplink transmissions from the other earbud. In such cases, when a first sink device is able to detect or receive acknowledgements that a second sink device transmits, which may not be received by the source device, the first sink device may enter an acknowledgement assistance mode in which the first sink device transmits acknowledgements to the source device when the source device retransmits a packet that the first (assisting) sink device knows has already been received and acknowledged by the second (assisted) sink device. Additionally, or alternatively, in some cases, the sink devices may be associated with a peripheral device, such as a charging case that can be used to charge or recharge wireless earbuds or a smart watch that can be paired to the same source device as the sink devices, which typically has a larger battery than the sink devices and often has built-in wireless connectivity (e.g., to support a device localization feature to assist a user with finding the peripheral device if and/or when the peripheral device is misplaced). In such cases, the peripheral device may act as the assisting device for one or multiple sink devices, and may send acknowledgements to the source device whenever the peripheral device detects a retransmission of a packet that a sink device has already acknowledged.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a WPAN 100, according to some implementations. Within the WPAN 100, a central device 102 (which may be referred to herein as a source device or using other suitable terminology) may connect to and may establish a communication link 116 with one or more peripheral devices 104, 106, 108, 110, 112, 114 (which may be referred to herein as sink devices or using other suitable terminology) using a BLE protocol or a modified BLE protocol. The BLE protocol is part of the BT core specification and enables radio frequency communication operating within the globally accepted 2.4 GHZ Industrial, Scientific, and Medical (ISM) band.

In some aspects, as described herein, the central device 102 may include suitable logic, circuitry, interfaces, processors, and/or code that may be used to communicate with the one or more peripheral devices 104, 106, 108, 110, 112, and/or 114 using the BLE protocol or the modified BLE protocol. In some aspects, the central device 102 may operate as an initiator to request establishment of a link layer (LL) connection with an intended peripheral device 104, 106, 108, 110, 112, and/or 114. In some aspects, a link manager may be used to control operations between a WPAN application controller in the central device 102 and a WPAN application controller in each of the intended peripheral devices 104, 106, 108, 110, 112, and/or 114.

In some aspects, after a requested LL connection is established, the central device 102 may become a host device, and the selected or intended peripheral device 104, 106, 108, 110, 112, and/or 114 may become paired with the central device 102 over the established LL connection. As a host device, the central device 102 may support multiple concurrent LL connections with various peripheral devices 104, 106, 108, 110, 112, and/or 114 that are operating as client devices. For example, the central device 102 may manage various aspects of data packet communication in an LL connection with one or more associated peripheral devices 104, 106, 108, 110, 112, and/or 114. For example, the central device 102 may determine an operation schedule in the LL connection with one or more peripheral devices 104, 106, 108, 110, 112, and/or 114. The central device 102 may also initiate an LL protocol data unit (PDU) exchange sequence over the LL connection. LL connections may be configured to run periodic connection events in dedicated data channels. The exchange of LL data PDU transmissions between the central device 102 and one or more of the peripheral devices 104, 106, 108, 110, 112, and/or 114 may take place within connection events.

In some aspects, the central device 102 may be configured to transmit the first LL data PDU in each connection event to an intended peripheral device 104, 106, 108, 110, 112, and/or 114. Additionally, or alternatively, in some aspects, the central device 102 may utilize a polling scheme to poll the intended peripheral device 104, 106, 108, 110, 112, and/or 114 for an LL data PDU transmission during a connection event. The intended peripheral device 104, 106, 108, 110, 112, and/or 114 may transmit an LL data PDU upon receipt of a packet carrying an LL data PDU from the central device 102. In some other aspects, a peripheral device 104, 106, 108, 110, 112, and/or 114 may transmit an LL data PDU to the central device 102 without first receiving an LL data PDU from the central device 102.

Examples of the central device 102 may include a cellular phone, a smartphone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player, a camera, a game console, a tablet, a smart device, a wearable device (such as a smart watch or wireless headphones), a vehicle, a vehicle infotainment system or car kit, an electric meter, a gas pump, a toaster, a thermostat, a hearing aid, a blood glucose on-body unit, an Internet-of-Things (IoT) device, or the like.

Examples of the one or more peripheral devices 104, 106, 108, 110, 112, and/or 114 may include a cellular phone, a smartphone, an SIP phone, an STA, a laptop, a PC, a desktop computer, a PDA, a satellite radio, a global positioning system, a multimedia device, a video device, a digital audio player, a camera, a game console, a tablet, a smart device, a wearable device (e.g., a smart watch, wireless headphones, or wireless earbuds), a vehicle, a vehicle infotainment system or car kit, an electric meter, a gas pump, a toaster, a thermostat, a hearing aid, a blood glucose on-body unit, an IoT device, or the like. Although the central device 102 is illustrated in FIG. 1 as being in communication with six peripheral devices 104, 106, 108, 110, 112, and 114 in the WPAN 100, it will be appreciated that the central device 102 may communicate with more or fewer than six peripheral devices within the WPAN 100 without departing from the scope of the present disclosure.

In some aspects, a device implementing the BT protocol (e.g., the central device 102) may operate according to a first radio mode (e.g., a basic rate (BR)/enhanced data rate (EDR) radio mode), and a device implementing the BLE protocol may operate according to a second radio mode (e.g., the BLE radio mode). In some aspects, the central device 102 may be configured with dual radio modes, and therefore may be able to operate according to the BR/EDR mode or the BLE mode, for example, based on the type of short-range wireless communication in which the central device 102 may engage.

For example, in some aspects, the central device 102 may operate according to the BR/EDR mode for continuous streaming of data, for broadcast networks, for mesh networks, and/or for some other applications in which a relatively higher data rate may be more suitable. Additionally, or alternatively, the central device 102 may operate according to the BLE mode for short burst data transmissions, such as for some other applications in which power conservation may be desirable and/or a relatively lower data rate may be acceptable. Additionally, or alternatively, in some aspects, the central device 102 may operate according to one or more other radio modes, such as proprietary radio mode(s). Examples of other radio modes may include high speed radio modes, low energy radio modes, and/or isochronous radio modes, among other examples.

In some aspects, as described in more detail elsewhere herein, an assisting wireless device (e.g., among peripheral devices 104, 106, 108, 110, 112, and 114) may track a first retransmission metric that is based on a number of retransmitted packets that the assisting wireless device received from a source device, such as the central device 102. The assisting wireless device may receive, from a sink wireless device (e.g., among peripheral devices 104, 106, 108, 110, 112, and 114), an acknowledgement assistance request indicating a second retransmission metric for the sink wireless device. The assisting wireless device may transmit, to the sink wireless device, a response to the acknowledgement assistance request based on respective values of the first retransmission metric and the second retransmission metric. Additionally, or alternatively, the assisting wireless device may perform one or more other operations described herein.

In some aspects, as described in more detail elsewhere herein, a sink wireless device (e.g., among peripheral devices 104, 106, 108, 110, 112, and 114) may track a first retransmission metric that is based on a number of retransmitted packets that the sink wireless device received from a source device, such as the central device 102. The sink wireless device may transmit, to an assisting wireless device (e.g., among peripheral devices 104, 106, 108, 110, 112, and 114), an acknowledgement assistance request indicating the first retransmission metric tracked by the sink wireless device. The sink wireless device may receive, from the assisting wireless device, a response to the acknowledgement assistance request based on respective values of the first retransmission metric tracked by the sink wireless device and a second retransmission metric tracked by the assisting wireless device. Additionally, or alternatively, the sink wireless device may perform one or more other operations described herein.

As indicated above, FIG. 1 is provided as an example. Other examples may differ from what is described with regard to FIG. 1.

Figure 2:
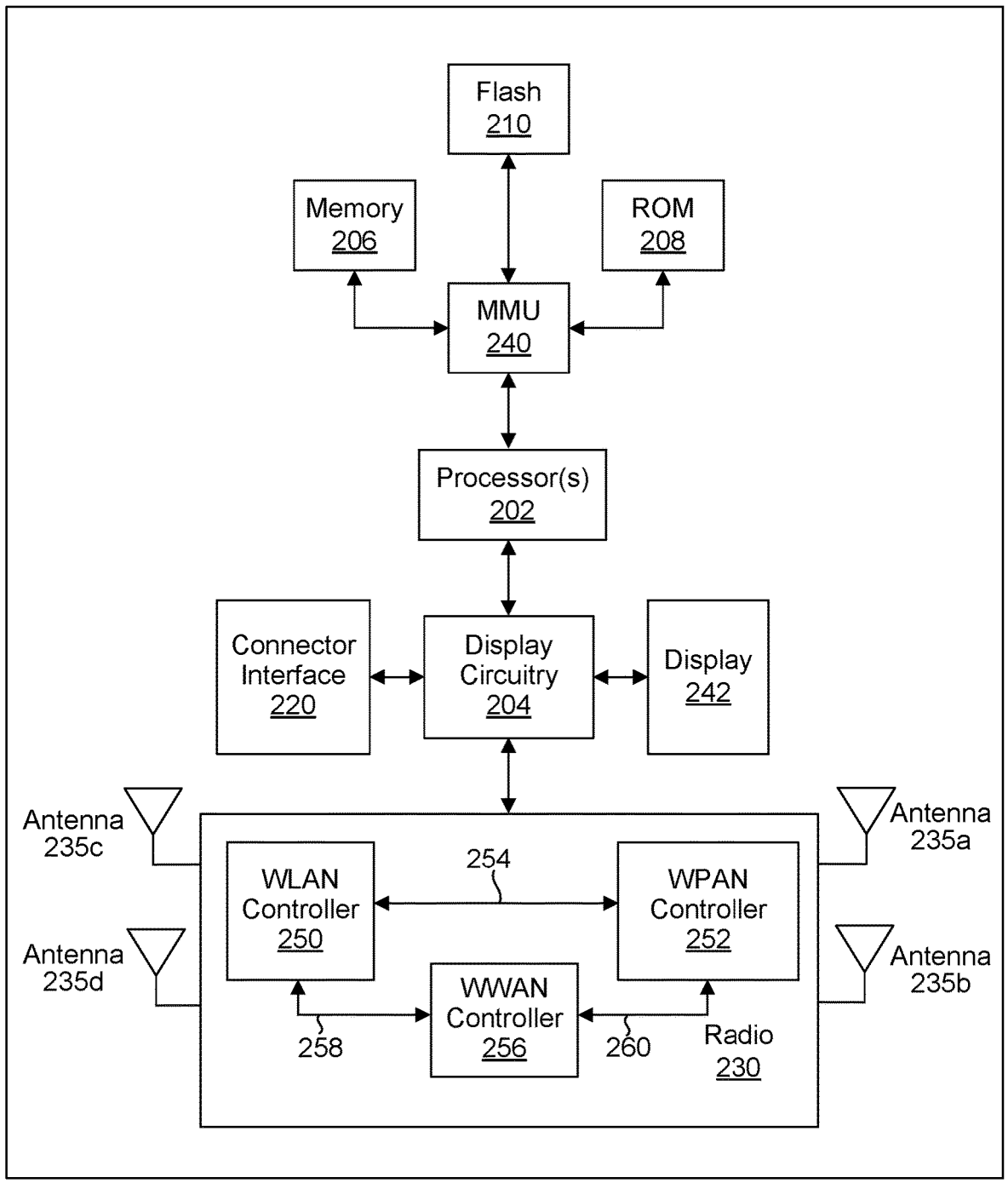
FIG. 2 is a diagram illustrating an example of a wireless communication device, in accordance with the present disclosure.

FIG. 2 is a diagram illustrating an example of a wireless communication device 200, in accordance with the present disclosure. In some aspects, the wireless communication device 200 may be an example of the central device 102 illustrated in FIG. 1. Additionally, or alternatively, the wireless communication device 200 may be an example of one or more of the peripheral devices 104, 106, 108, 110, 112, or 114 illustrated in FIG. 1. In some aspects, the wireless communication device 200 may be a Bluetooth-enabled device (such as a BLE device).

As shown in FIG. 2, the wireless communication device 200 may include a processing element, such as processor(s) 202, which may execute program instructions for the wireless communication device 200. The wireless communication device 200 may also include a display 242 that can perform graphics processing and present information to a user. The processor(s) 202 may also be coupled to memory management unit (MMU) 240, which may be configured to receive addresses from the processor(s) 202 and translate the addresses to address locations in memory such as memory 206, ROM 208, or flash memory 210 and/or to address locations in other circuits or devices, such as display circuitry 204, radio 230, connector interface 220, and/or display 242. The MMU 240 may also be configured to perform memory protection and page table translation or set up. In some aspects, the MMU 240 may be included as a portion of the processor(s) 202.

The processor(s) 202 may be coupled to other circuits of the wireless communication device 200. For example, the wireless communication device 200 may include various memory types, a connector interface 220 through which the wireless communication device 200 can communicate with a computer system, and wireless communication subsystems that can transmit data to, and receive data from, other devices based on one or more wireless communication standards or protocols. For example, in some aspects, the wireless communication subsystems may include (but are not limited to) a wireless local-area network (WLAN) subsystem, a WPAN subsystem, and/or a cellular subsystem (such as a Long-Term Evolution (LTE) or New Radio (NR) subsystem). The wireless communication device 200 may include multiple antennas 235a, 235b, 235c, and/or 235d for performing wireless communication with, for example, wireless communication devices in a WPAN.

The wireless communication device 200 may be configured to implement part or all of the techniques described herein by executing program instructions stored on a memory medium (such as a non-transitory computer-readable memory medium) and/or through hardware or firmware operation. In other embodiments, the techniques described herein may be at least partially implemented by a programmable hardware element, such as an FPGA, and/or an application specific integrated circuit (ASIC).

In some aspects, the radio 230 may include separate controllers configured to control communications for various respective radio access technology (RAT) protocols. For example, as shown in FIG. 2, radio 230 may include a WLAN controller 250 that manages WLAN communications, a WPAN controller 252 that manages Bluetooth, BLE, and/or other suitable WPAN communications, and a wireless wide area network (WWAN) controller 256 that manages WWAN communications. In some aspects, the wireless communication device 200 may store and execute a WLAN software driver for controlling WLAN operations performed by the WLAN controller 250, a WPAN software driver for controlling WPAN operations performed by the WPAN controller 252, and/or a WWAN software driver for controlling WWAN operations performed by the WWAN controller 256.

In some aspects, a first coexistence interface 254 (such as a wired interface) may be used for sending information between the WLAN controller 250 and the WPAN controller 252. Additionally, or alternatively, in some aspects, a second coexistence interface 258 may be used for sending information between the WLAN controller 250 and the WWAN controller 256. Additionally, or alternatively, in some aspects, a third coexistence interface 260 may be used for sending information between the WPAN controller 252 and the WWAN controller 256.

In some aspects, one or more of the WLAN controller 250, the WPAN controller 252, and/or the WWAN controller 256 may be implemented as hardware, software, firmware, or any suitable combination thereof.

In some aspects, the WLAN controller 250 may be configured to communicate with a second device in a WPAN using a WLAN link using one or more, some, or all of the antennas 235a, 235b, 235c, and 235d. In other configurations, the WPAN controller 252 may be configured to communicate with at least one second device in a WPAN using one or more, some, or all of the antennas 235a, 235b, 235c, and 235d. In other configurations, the WWAN controller 256 may be configured to communicate with a second device in a WPAN using one or more, some, or all of the antennas 235*a*. 235*b*, 235*c*, and 235*d*. The WLAN controller 250, the WPAN controller 252, and/or the WWAN controller 256 may be configured to adjust a wakeup time interval and a shutdown time for the wireless communication device 200.

A short-range wireless communications protocol, such as BT, BLE, and/or BR/EDR, may include and/or may use one or more other communications protocols, for example, to establish and maintain communications links. Referring also to FIG. 1, the wireless communication device 200 may establish a communications link 116 with one or more peripheral devices, such as a wireless headset 112, according to at least one communications protocol for short-range wireless communications. In some aspects, the communications link 116 may include a communications link that adheres to a protocol included and/or for use with BT, BLE, BR/EDR, or the like. In one aspect, the communications link 116 may include an asynchronous connection-oriented logical (ACL) transport, sometimes referred to as an ACL link. When operating as an ACL link, the communications link 116 may allow the central device 102 (e.g., a source device) to connect or "pair" with a peripheral device, such as the headset 112. The connection is asynchronous in that the two devices may not need to synchronize, timewise, data communications between each other to permit communication of data packets via the communications link 116.

In some aspects, a logical link control and adaptation protocol (L2CAP) may be used within a BT protocol stack (not shown in FIG. 2 for simplicity). An L2CAP connection may be established after an ACL link has been established. Reference to L2CAP in the present disclosure may be further applicable to enhanced L2CAP (EL2CAP), which may be an enhanced version of the L2CAP protocol that enables multiplexing of multiple logical data channels via a single radio connection.

In some aspects, the communications link 116 may include an advanced audio distribution profile (A2DP) link. For example, an A2DP link may provide a point-to-point link between a source device, such as the central device 102, and a sink device, such as the headset 112. With an A2DP link, data packets including audio may be transmitted over an ACL channel, and other information (e.g., for controlling the audio stream) may be transmitted over a separate control channel. The data packets may occur non-periodically.

In some aspects, the communications link 116 may support synchronous logical transport mechanisms between a source device (such as the central device 102) and a peripheral device (such as the headset 112). For example, the communications link 116 may include a synchronous connection-oriented (SCO) link that provides a symmetric point-to-point link between the source device and the peripheral device using time slots reserved for BT communications. In some aspects, an SCO link may not support retransmission of data packets, which may be unsatisfactory in audio streaming and/or voice call use cases in which a dropped audio or voice packet may reduce the quality of the user experience.

In some aspects, the communications link 116 may include an extended SCO (eSCO) link. An eSCO link may provide a symmetric or asymmetric point-to-point link between a source device and a peripheral device using time slots reserved for BT communications, and may also provide for a retransmission window following the reserved time slots. Because retransmissions may be facilitated using the retransmission window, an eSCO link may be suitable for audio streaming and/or voice call use cases because a dropped audio or voice packet may be retransmitted, and therefore the probability of successfully receiving a data packet may be increased.

In some aspects, the communications link 116 shown in FIG. 1 may include an isochronous (ISO) link. When operating as an ISO link, the communications link 116 may combine some features of both synchronous and asynchronous links. For example, a stream on an ISO link may begin with a start packet, and then data packets may be asynchronously transmitted. On an ISO link, the number of retransmission attempts by a transmitting device may be limited. Thus, if a receiving device is unable to decode a data packet within the limited number of retransmission attempts, then the data packet may be dropped, and the receiving device may continue to receive the stream without data from the dropped data packet.

In some aspects, the wireless communication device 200 may include means for tracking a first retransmission metric that is based on a number of retransmitted packets that the wireless communication device 200 received from a source device; means for receiving, from a sink wireless device, an acknowledgement assistance request indicating a second retransmission metric for the sink wireless device; and/or means for transmitting, to the sink wireless device, a response to the acknowledgement assistance request based on respective values of the first retransmission metric and the second retransmission metric. In some aspects, the means for the wireless communication device 200 to perform operations described herein may include, for example, one or more of antennas 235*a*-235*d*, WPAN controller 252, radio 230, and/or processor 202, among other examples.

Additionally, or alternatively, the wireless communication device 200 may include means for tracking a first retransmission metric that is based on a number of retransmitted packets that the wireless communication device 200 received from a source device; means for transmitting, to an assisting wireless device, an acknowledgement assistance request indicating the first retransmission metric tracked by the wireless communication device 200; and/or means for receiving, from the assisting wireless device, a response to the acknowledgement assistance request based on respective values of the first retransmission metric tracked by the wireless communication device 200 and a second retransmission metric tracked by the assisting wireless device. In some aspects, the means for the wireless communication device 200 to perform operations described herein may include, for example, one or more of antennas 235*a*-235*d*, WPAN controller 252, radio 230, and/or processor 202, among other examples.

As indicated above, FIG. 2 is provided as an example. Other examples may differ from what is described with regard to FIG. 2.

Figure 3:
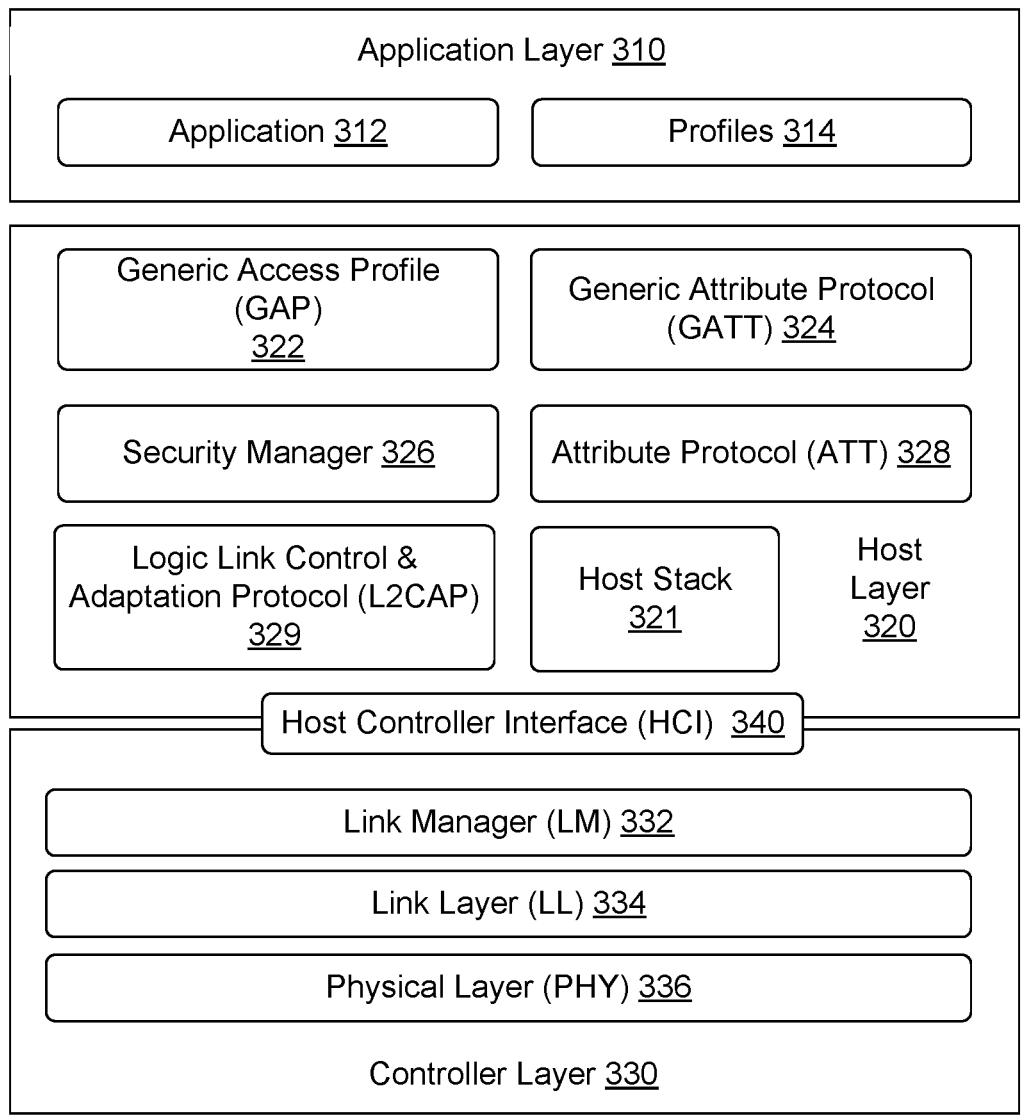
FIG. 3 is a diagram illustrating an example of a protocol stack, in accordance with the present disclosure.

FIG. 3 is a diagram illustrating an example 300 of a protocol stack (e.g., a WPAN and/or a Bluetooth protocol stack), in accordance with the present disclosure. In some aspects, the protocol stack 300 may be implemented in a wireless communication device (such as the central device 102 or one or more of the peripheral devices 104, 106, 108, 110, 112, or 114 of FIG. 1). For example, the protocol stack 300 may be implemented by one or more of processor(s) 202, memory 206, flash memory 210, ROM 208, the radio 230, and/or the WPAN controller 252 illustrated in FIG. 2. In some aspects, the protocol stack 300 may be organized into three layers that include an application layer 310, a host layer 320, and a controller layer 330.

In some aspects, the application layer 310 may be a user application layer that interfaces with the other blocks and/or layers of the protocol stack 300. In some aspects, the application layer 310 may include one or more applications 312 and one or more Bluetooth profiles 314 that allow the one or more applications 312 to use Bluetooth and/or BLE communications. The host layer 320 may include the upper layers of the protocol stack 300, and may communicate with a controller (such as the WPAN controller 252 of FIG. 2) in a wireless communication device using a host controller interface (HCI) 340. In some aspects, the host layer 320 may include a host stack 321 that can be used for application layer interface management to allow an application 312 to access WPAN communications.

The controller layer 330 may include the lower layers of the protocol stack 300. In some aspects, the controller layer 330 may be used for hardware interface management, link establishment, and link management. As shown in FIG. 3, the controller layer 330 may include a link manager (LM) 332, a link layer 334, and a physical (PHY) layer 336. The PHY layer 336 may include, for example, a radio and/or a baseband processor. In some aspects, the PHY layer 336 may define a mechanism for transmitting a bit stream over a physical link or channel that connects WPAN devices. The bit stream may be grouped into code words or symbols, and may be converted to a data packet that is transmitted over a wireless transmission medium. The PHY layer 336 may provide an electrical, mechanical, and/or procedural interface to the wireless transmission medium. The PHY layer 336 may be responsible for modulation and demodulation of data into radio frequency (RF) signals for transmission over the air. The PHY layer 336 may describe the physical characteristics of a transmitter/receiver (or transceiver) included in a wireless communication device. The physical characteristics may include modulation characteristics, an RF tolerance, and/or a sensitivity level, among other examples.

In some aspects, the link layer 334 is responsible for low-level communication over the PHY layer 336. The link layer 334 may manage the sequence and timing for transmitting and receiving data packets, and using a LL protocol, communicates with other devices regarding connection parameters and data flow control. The link layer 334 also provides gatekeeping functionality to limit exposure and data exchange with other devices. If filtering is configured, the link layer 334 maintains a list of allowed devices and may ignore all requests for data exchange from devices not on the list of allowed devices. The link layer 334 may also reduce power consumption. In some aspects, the link layer 334 may include a proprietary LL that may be used to discover peer devices, and establish a secure communication channel with the peer devices. In some aspects, the link layer 334 may be responsible for transporting data packets between devices in a WPAN. Each data packet may include an access address, which specifies the type of logical transport used to carry the data packet. Logical transports may exist between a master device and slave devices. Additionally, some logical transports may carry multiple logical links.

The link manager 332 may be responsible for establishing and configuring links and managing power-change requests, among other tasks. Each type of logical link, such as ACL links, A2DP links, SCO links, eSCO links, ISO links, or the like, may be associated with a specific packet type. For example, an SCO link may provide reserved channel bandwidth for communication between a central device and a peripheral device, and may support regular, periodic exchange of data packets with no retransmissions. An eSCO link may provide reserved channel bandwidth for communication between a source device and a peripheral device, and support regular, periodic exchange of data packets with retransmissions. An ACL link may exist between a source device and a peripheral device from the beginning of establishment of a connection between the source device and the peripheral device, and the data packets for ACL links may include encoding information in addition to a payload.

The link manager 332 may communicate with the host layer 320 using the HCI 340. In some aspects, the link manager 332 may translate commands associated with the HCI 340 into controller-level operations, such as baseband-level operations. The HCI 340 may act as a boundary between the lower layers (such as between the controller layer 330, the host layer 320, and the application layer 310). The BT specification may define a standard HCI to support BT systems that are implemented across two separate processors. For example, a BT system on a computer may use a processor of the BT system to implement the lower layers of the protocol stack 300, such as the PHY layer 336, the link layer 334, and/or the link manager 332, and may use a processor of a BT component to implement the other layers of the protocol stack 300, such as the host layer 320 and the application layer 310.

In FIG. 3, the host layer 320 is shown to include a generic access profile (GAP) 322, a generic attribute protocol (GATT) 324, a security manager (SM) 326, an attribute protocol (ATT) 328, and an L2CAP layer 329. The GAP 322 may provide an interface for an application 312 to initiate, establish, and manage connections with other WPAN (e.g., BT or BLE) devices. The GATT 324 may provide a service framework using the attribute protocol for discovering services, and for reading and writing characteristic values on a peer device. The GATT 324 may interface with the application 312, for example, through a profile which may define a collection of attributes and any permission needed for the attributes to be used in BT or BLE communications.

The security manager 326 may be responsible for device pairing and key distribution. A security manager protocol implemented by the security manager 326 may define how communications with the security manager of a counterpart BLE device are performed. The security manager 326 provides additional cryptographic functions that may be used by other components of the protocol stack 300. The architecture of the security manager 326 used in WPAN communications is designed to minimize recourse requirements for peripheral devices by shifting work to a presumably more powerful central device. BLE uses a pairing mechanism for key distribution. The security manager 326 provides a mechanism to encrypt the data and a mechanism to provide data authentication.

The ATT 328 includes a client/server protocol based on attributes associated with a BLE device configured for a particular purpose. Examples may include monitoring heart rate, temperature, broadcasting advertisements, or the like. The attributes may be discovered, read, and written by peer devices. The set of operations which are executed over the ATT 328 may include error handling, server configuration, find information, read operations, write operations, and/or queued writes. The ATT 328 may form the basis of data exchange between BT and BLE devices.

The L2CAP layer 329 may be implemented above the HCI 340, and may communicate with the controller layer 330 through the HCI 340. The L2CAP layer 329 may be responsible for establishing connections across one or more existing logical links and for requesting additional links if none exist. The L2CAP layer 329 may also implement multiplexing between different higher-layer protocols, for example, to allow different applications to use a single link, such as a logical link, including an ACL link. In some implementations, the L2CAP layer 329 may encapsulate multiple protocols from the upper layers into a data packet format (and vice versa). The L2CAP layer 329 may also break packets with a large data payload from the upper layers into multiple packets with the data payload segmented into smaller size data payloads that fit into a maximum payload size (for example, twenty-seven (27) bytes) on the transmit side.

In some standards and protocols, such as BLE and/or BR/EDR, the central device 102 may detect errors in a packet and/or a dropped/missed/not received packet through the use of cyclic redundancy check (CRC) validation and through the use of message integrity code (MIC) validation. MIC validation may be used when a packet is encrypted. For example, failure of CRC validation may indicate one or more errors in a received packet, and failure of MIC validation may indicate that another packet has not been received (although failure of CRC validation may also indicate that another packet has not been received, and/or failure of MIC validation may also indicate one or more errors in a received packet).

CRC validation and MIC validation may be based on generating CRC values and MICs, respectively, based on received packets and respectively comparing those generated CRC values and MICs to CRC values and MICs included in the received packets. Specifically, a receiving device, such as the headset 112, that receives a packet may first generate a CRC value or a CRC checksum based on the received packet, such as based on a payload and, if applicable, an MIC included in the received packet. The receiving device may compare the generated CRC value with a CRC value included in the received packet. If the generated CRC value matches the CRC value included in the received packet, then the received packet may be validated for CRC. The CRC-validated received packet may then be decrypted. However, if the generated CRC value does not match the CRC value included in the received packet, then the receiving device may determine that the received packet fails CRC validation. If the receiving device determines that the received packet fails CRC validation, then the received packet may include errors and/or may be corrupted. In one configuration, the receiving device may discard the received packet that fails CRC validation. Alternatively, in another configuration, the receiving device may attempt to recover the received packet, for example, using one or more error correction techniques.

If the received packet is encrypted and passes CRC validation, then the receiving device may decrypt the received packet to obtain a decrypted payload and a decrypted MIC. For MIC validation, the receiving device may generate an MIC based on the decrypted payload, and compare the generated MIC with the MIC obtained from the decrypted received packet. If the generated MIC matches the decrypted MIC, then the receiving device may determine that the received packet is successfully decrypted. When the received packet is successfully decrypted, the decoded and decrypted payload of the received packet may be provided to another layer of the receiving device, such as a coder-decoder (codec) of the receiving device that may cause the payload data of the received packet to be output by the receiving device, for example, as audio through speakers of the headset 112.

If the generated MIC does not match the decrypted MIC of the received packet, then the receiving device may determine that the received packet is unsuccessfully decrypted. When the received packet is unsuccessfully decrypted, then a different packet may have been missed or the received packet may be erroneous or otherwise corrupted. In one configuration, the receiving device may discard the received packet that fails MIC validation. Alternatively, in another configuration, the receiving device may attempt to recover the received packet.

As indicated above, FIG. 3 is provided as an example. Other examples may differ from what is described with regard to FIG. 3.

Figure 4:
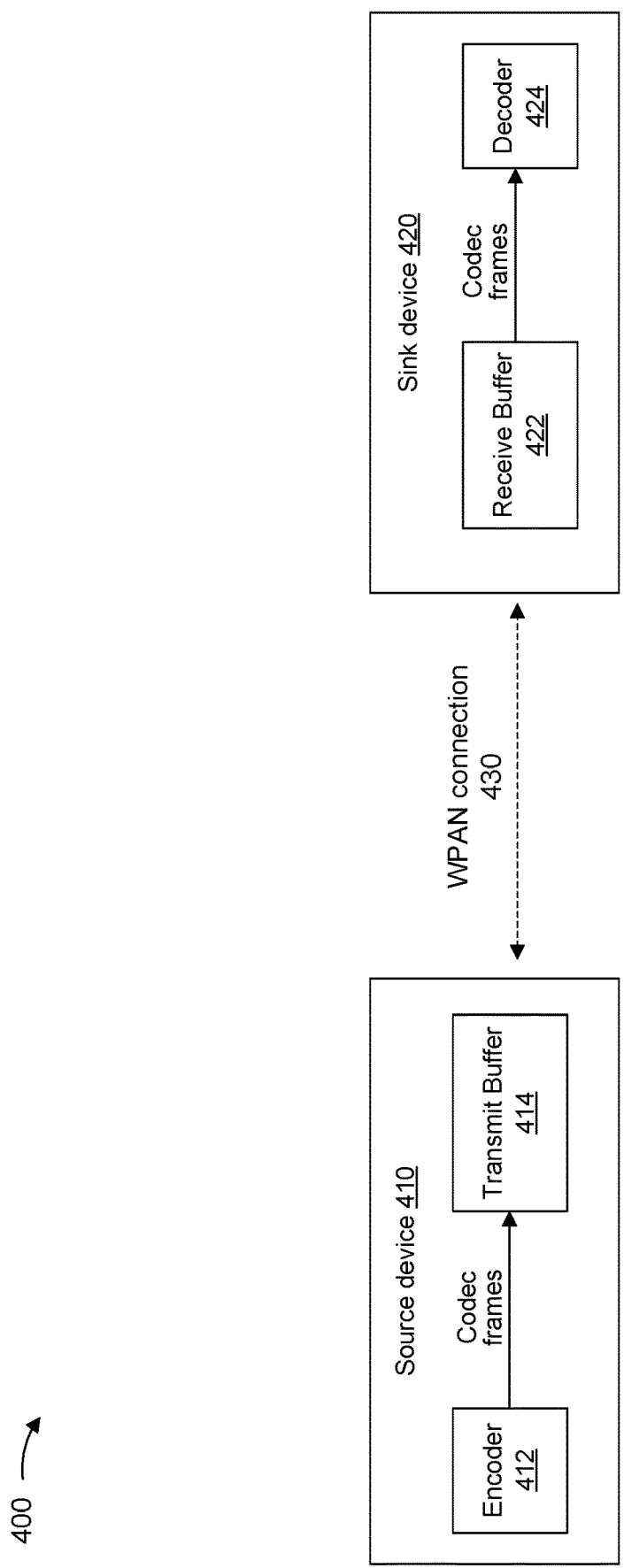
FIG. 4 is a diagram illustrating an example transmission of a data packet from a wireless communication device to a peripheral device over a WPAN connection, in accordance with the present disclosure.

FIG. 4 is a diagram illustrating an example transmission 400 of a data packet from a source device 410 to a sink device 420 over a WPAN connection 430, according to the present disclosure. In some aspects, the source device 410 may be one example of the central device 102 in FIG. 1 and/or the wireless communication device 200 in FIG. 2, and the sink device 420 may be an example of one or more of the peripheral devices 104, 106, 108, 110, 112 or 114 in FIG. 1. In some aspects, the sink device 420 may be wireless earbud, a pair of wireless earbuds, a wireless speaker, or another suitable device. The WPAN connection 430 may be any suitable Bluetooth or BLE connection or link. In some instances, the WPAN connection 430 may be one or more of an ACL link, an L2CAP link, an A2DP link, an SCO link, or an ISO link.

As shown in FIG. 4, the source device 410 may include an encoder 412 and a transmit buffer 414. The encoder 412 may be configured to encode data, such as audio or video data, using a specified bitrate. The transmit buffer 414 may be configured to queue data packets that are to be transmitted over the WPAN connection 430 to the sink device 420. In some implementations, the data packets to be transmitted over the WPAN connection 430 may have a predefined size, for example, based on the type of WPAN connection 430 and/or channel conditions associated with the WPAN connection 430. In some aspects, data encoded by the encoder 412 may be packetized into a data packet of a predefined size. The source device 410 may de-queue data packets from the transmit buffer 414 and transmit the data packets to the sink device 420 over the WPAN connection 430.

As further shown in FIG. 4, the sink device 420 may include a receive buffer 422 and a decoder 424. Data packets that the sink device 420 receives over the WPAN connection 430 may be queued or otherwise stored in the receive buffer 422. The data packets may be output from the receive buffer 422 and forwarded to the decoder 424. In some aspects, the decoder 424 may decode data (such as audio and/or video data) carried in the payloads of the queued data packets, and forward the decoded data to upper layers of the protocol stack for processing and playback to a user. In some implementations, the encoder 412 may encode a first encoder/decoder (codec) frame using a first bitrate and forward the first codec frame to the transmit buffer 414 to be packetized for transmission to the sink device 420 over the WPAN connection 430. The sink device 420 may queue the received data packet in the receive buffer 422 and may forward the first portion of the first codec frame to the decoder 424 for decoding.

As indicated above, FIG. 4 is provided as an example. Other examples may differ from what is described with regard to FIG. 4.

Figure 5:
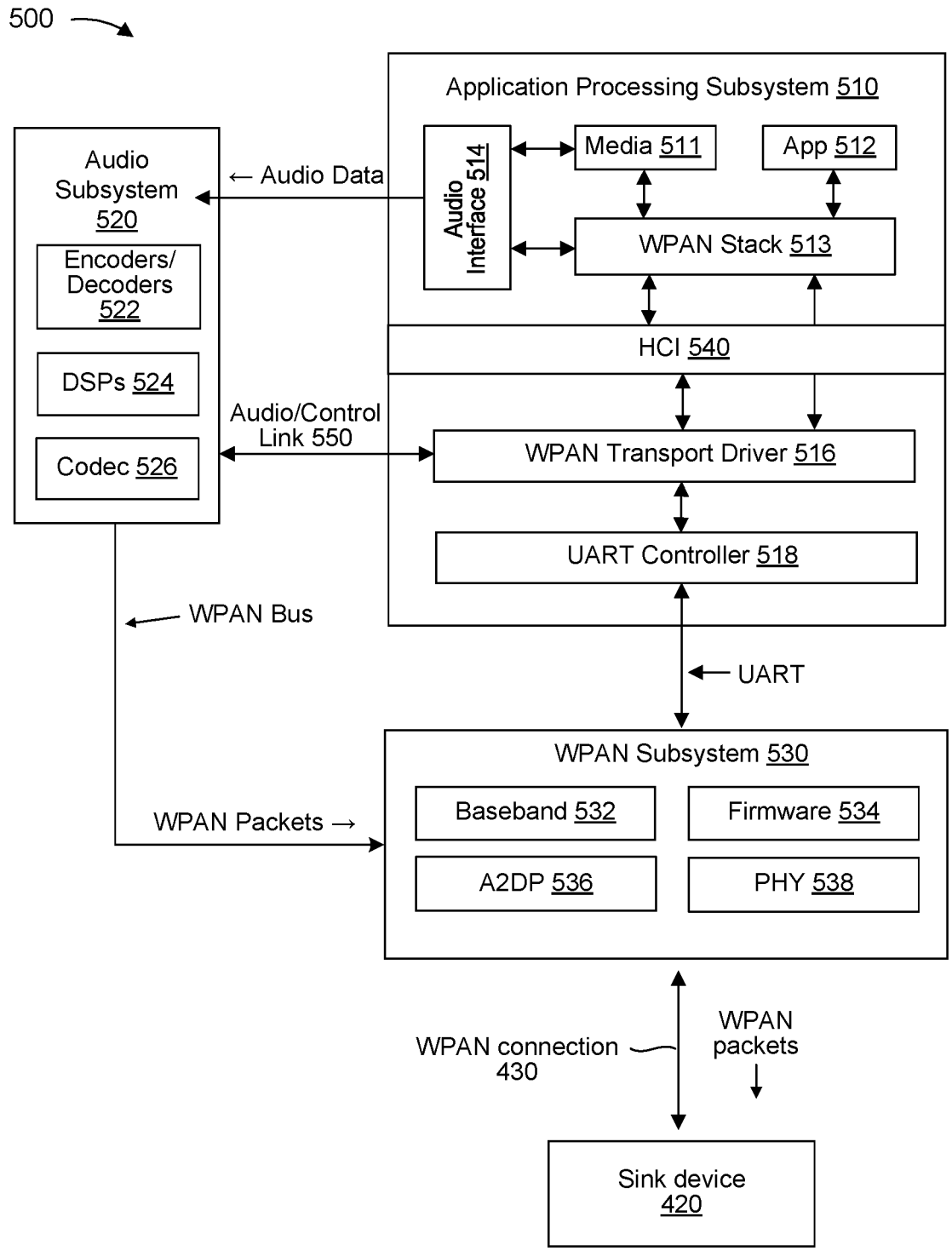
FIG. 5 is a diagram illustrating an example of a wireless communication device, in accordance with the present disclosure.

FIG. 5 is a diagram illustrating an example 500 of a wireless communication device 500, according to the present disclosure. In some aspects, the wireless communication device 500 may be an example of the central device 102 in FIG. 1, the wireless communication device 200 in FIG. 2, or the source device 410 in FIG. 4. In example 500, the wireless communication device 500 is depicted as having an established WPAN connection 430 (e.g., a Bluetooth communication connection) with the sink device 420 in FIG. 4.

The wireless communication device 500 may include an application processing subsystem 510, an audio subsystem 520, a WPAN subsystem 530, and an HCI 540. The application processing subsystem 510, which may correspond to at least some portions of the application layer 310 and the host layer 320 of the protocol stack 300 of FIG. 3, is shown to include a media player 511, an application layer 512, a WPAN stack 513, and an audio interface 514. The media player 511 can be any suitable device or component capable of generating or receiving multimedia content including, for example, real-time audio streams, real-time video streams, real-time gaming streams, and/or latency-sensitive traffic, among other examples. The application layer 512, which may be one implementation of the application layer 310 of FIG. 3, includes at least one Bluetooth profile that defines the collection of attributes and associated permissions to be used in Bluetooth or BLE communications. In some aspects, the application layer 512 may include processing resources including, for example, the memory 206, the ROM 208, and/or the flash memory 210 of FIG. 2. The WPAN stack 513 may be one implementation of the protocol stack 300 of FIG. 3.

In some aspects, as shown in FIG. 5, the application processing subsystem 510 may include a WPAN transport driver 516, which may include a split audio and packetization module (not shown for simplicity) that can packetize data (such as audio and/or video data) into Bluetooth frames that can be transmitted to the sink device 420 using a Bluetooth and/or BLE protocol. In some aspects, the WPAN transport driver 516 may be connected to the audio subsystem 520 via an audio and control link 550. In some aspects, the audio and control link 550 may be used to send encoded audio/video data and control signals between the WPAN transport driver 516 and audio/video DSPs within the audio subsystem 520. The WPAN transport driver 516 is also connected to a universal asynchronous receiver-transmitter (UART) controller 518 that provides controls for transmission of information via the WPAN connection 430.

The audio subsystem 520 may include encoders/decoders 522, one or more DSPs 524, and one or more codecs 526. The encoders/decoders 522 may be used to sample audio/video data extracted from one or more packets received from another wireless communication device. The extracted audio/video data may be processed in the application processing subsystem 510 based at least in part on the Bluetooth profile. In some implementations, the encoders/decoders 522 may partition the sampled audio/video data into payloads that can be embedded within one or more Bluetooth packets for transmission to the sink device 420 over the WPAN connection 430. In some instances, the DSPs 524 and/or the codecs 526 may employ one or more encoding or decoding algorithms in conjunction with sampling the audio data.

The WPAN subsystem 530 may include a baseband component 532 (e.g., a Bluetooth baseband component), a firmware component 534, an A2DP component 536, and a PHY component 538. The baseband component 532 and the firmware component 534 may be used to generate baseband signals for constructing and deconstructing data frames based on the Bluetooth or BLE protocol. The baseband component 532 and the firmware component 534 may also be used to generate carrier signals for up-converting baseband signals during data transmissions and for down-converting received data signals to baseband. The A2DP component 536 may be used to control or manage an A2DP link between the wireless communication device 500 and the sink device 420. Specifically, when the WPAN subsystem 530 is in a receive mode, the PHY component 538 can be used to receive, demodulate, and down-convert data packets received over the WPAN connection 430, and to forward the data packets to the application processing subsystem 510. When the WPAN subsystem 530 is in a transmit mode, the PHY component 538 can be used to encapsulate data provided from the upper layers into one or more Bluetooth frames or packets for transmission to the sink device 420 over the WPAN connection 430.

As indicated above, FIG. 5 is provided as an example. Other examples may differ from what is described with regard to FIG. 5.

FIGS. 6A-6E are diagrams illustrating examples 600 associated with assisted acknowledgment for wireless streaming, in accordance with the present disclosure. As shown in FIGS. 6A-6E, examples 600 include communication between a source device (e.g., central device 102, wireless communication device 200, source device 410, or the like) and multiple sink devices (e.g., peripheral devices 104, 106, 108, 110, 112, and/or 114, wireless communication device 200, sink device 420, or the like). In some aspects, the source device and the sink devices may communicate in a WPAN, such as WPAN 100 or the like.

For example, in some aspects, the source device may correspond to a central device that transmits wireless streams to the multiple sink devices, and one or more of the multiple sink devices may act as an assisting wireless device that supports an acknowledgement assistance mode in which the assisting wireless device can transmit assisted acknowledgements to the source device when the source device retransmits a packet that another sink device has already received and acknowledged. In some aspects, in examples 600, each sink device may be aware of the streams that are established for each of the sink devices, and may be capable of receiving packets and transmitting acknowledgements on both streams (e.g., in connection with a CIS delegation or CIS mirroring feature). Accordingly, each sink device may support operating in an acknowledgement assistance mode to transmit assisted acknowledgements to the source device when the source device retransmits a packet that another sink device has already received and acknowledged to reduce unnecessary retransmissions, conserve bandwidth, conserve power, and/or increase an effective range of a wireless streaming use case.

Figure 6A:
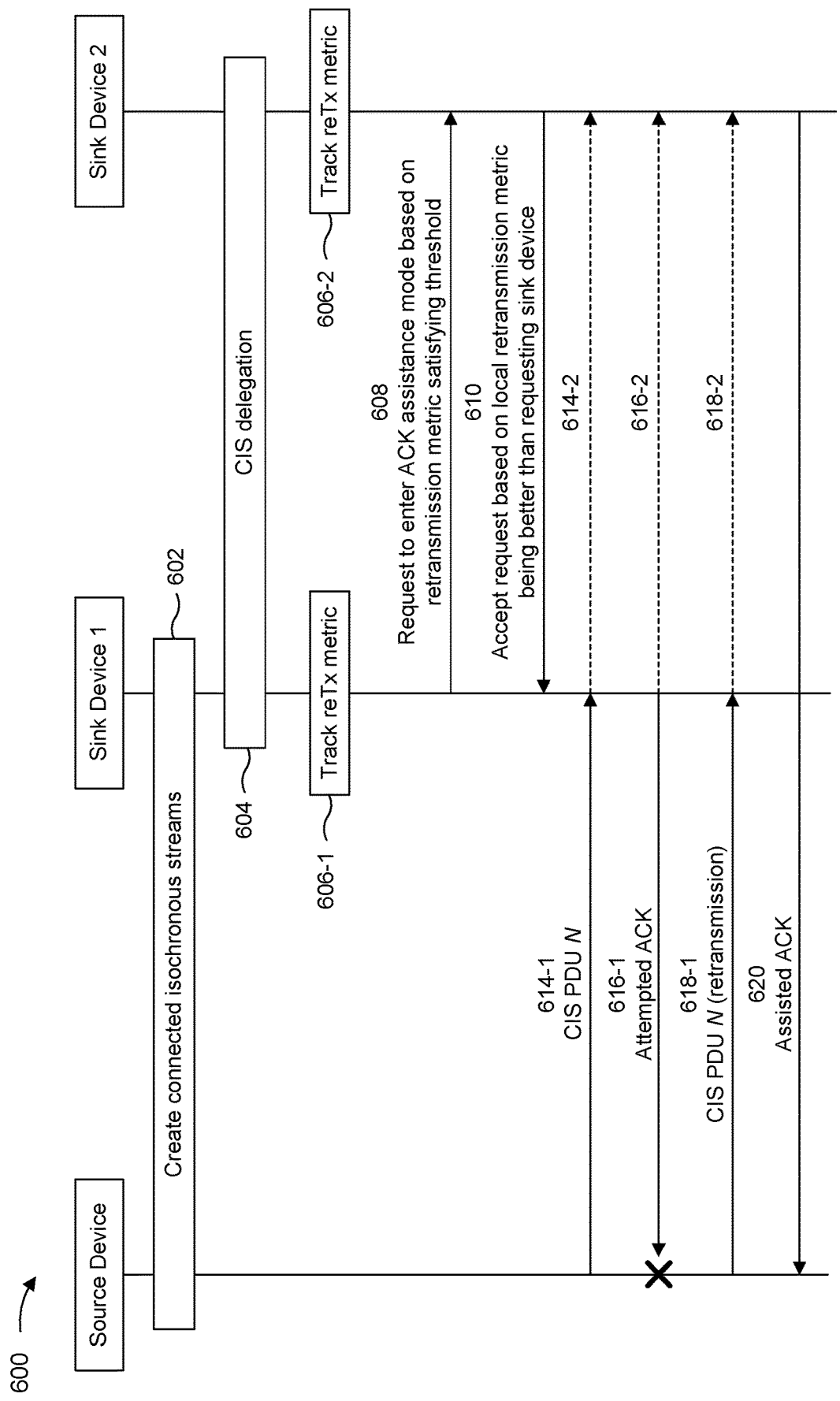
FIGS. 6A-6E are diagrams illustrating examples associated with assisted acknowledgment for wireless streaming, in accordance with the present disclosure.

For example, FIG. 6A depicts a call flow in which a first sink device (shown as "Sink Device 1") may request that a second sink device (shown as "Sink Device 2") enter an acknowledgement assistance mode to assist with sending acknowledgements to the source device for packets that are successfully received by the first sink device. For example, as shown by reference number 602, the source device may initially create a CIS on the first sink device and the second sink device to transmit respective streams to the first sink device and the second sink device (e.g., left and right audio streams where the first sink device and the second sink device correspond to left and right wireless earbuds). As further shown in FIG. 6A, and by reference number 604, the first sink device and the second sink device may then communicate to enable CIS delegation for one or both CISs. For example, in cases where the source device and the sink devices are operating in a CIS delegation mode or a CIS mirroring mode, the first sink device may be designated as a connected peripheral (or connected sink) device, and the second sink device may be designated as a shadowing peripheral (or shadowing sink) device. In the CIS delegation mode, the source device may establish a first CIS for the first sink device and a second CIS for the second sink device, and the first (connected) sink device may communicate with the second (shadowing) sink device to delegate the second CIS to the second sink device (e.g., delegating responsibility for receiving data and transmitting acknowledgements for the second CIS to the second sink device). Furthermore, in some aspects, the first sink device may provide the second sink device with one or more parameters related to the first CIS (that is not delegated) such that the second sink device may subsequently receive data and transmit acknowledgements for the first CIS in cases where the second sink device is operating in the acknowledgement assistance mode. Alternatively, in some aspects, the first sink device may request that the second sink device mirror the first CIS in the CIS mirroring mode.

As further shown in FIG. 6A, and by reference numbers 606-1 and 606-2, each sink device may track a retransmission metric based on a number of retransmissions that the respective sink device receives from the source device over time. For example, in some aspects, the retransmission metric that is tracked by each sink device may be a moving average of the number of retransmissions that the respective sink device received from the source device over a moving time window. Furthermore, in some aspects, the retransmissions that the sink devices track for calculating or otherwise determining the retransmission metric may be limited to retransmissions of packets that are received after an acknowledgement of the packet was transmitted (e.g., to exclude retransmissions that are expected to occur after the sink device fails to receive an initial transmission or a retransmission of an packet). Alternatively, in some aspects, the retransmissions that the sink devices track for calculating or otherwise determining the retransmission metric may include any retransmissions of packets regardless of whether the retransmissions occur after an acknowledgement of an packet that was successfully received (e.g., to provide a general metric related to a link quality between the sink device and the source). Additionally, or alternatively, the retransmission metric may be based on one or more measurements related to the link quality between the sink device and the source, such as a received signal strength indicator (RSSI) or another suitable measurement.

As further shown in FIG. 6A, and by reference number 608, the first sink device may transmit, to the second sink device, a request to enter the acknowledgement assistance mode based on the retransmission metric of the first sink device satisfying a threshold. For example, in some aspects, the retransmission metric of the first sink device may satisfy the threshold when the moving average of the number of retransmissions received by the first sink device equals or exceeds the threshold over a moving time window. Additionally, or alternatively, in some aspects, the retransmission metric of the first sink device may satisfy the threshold when the RSSI observed by the first sink device is equal to or less than the threshold. Additionally, or alternatively, in other examples, the retransmission metric may be based on multiple factors, such as applying a weight to the moving average of the number of retransmissions received by the first sink device over a moving time window based on the average RSSI observed by the first sink device over the moving time window (e.g., where a relatively higher RSSI may result in a relatively lower value for the retransmission metric). In any case, when the retransmission metric satisfies the applicable threshold, indicating that the source device may not be receiving or may be unable to reliably receive acknowledgements from the first sink device, the first sink device may request that the second sink device enter the acknowledgement assistance mode to assist with sending acknowledgements to the source device. For example, in some aspects, the request may be included in a PDU that contains an identifier of the first sink device, an identifier of the CIS associated with the first sink device, a flag that indicates whether the request is to enter or exit the acknowledgement assistance mode, and one or more fields that relate to the retransmission metric (e.g., the one or more fields may indicate the moving average of the number of retransmissions received over the moving time window and/or the RSSI observed over the moving time window, among other examples).

As further shown in FIG. 6A, and by reference number 610, the second sink device may transmit, to the first sink device, a message that indicates an acceptance of the request to enter the acknowledgement assistance mode. For example, in some aspects, the second sink device may generally accept the request to enter the acknowledgement assistance mode based on determining that the (local) retransmission metric of the second sink device is better than the retransmission metric of the first sink device that is requesting acknowledgement assistance. For example, in some aspects, the second sink device may determine that the local retransmission metric of the second sink device is better than the retransmission metric of the first sink device in cases where the average number of retransmissions received by the second sink device is less than the average number of retransmissions received by the first sink device and/or the RSSI observed by the second sink device is greater than the RSSI observed by the second sink device over the moving time window.

Figure 6B:
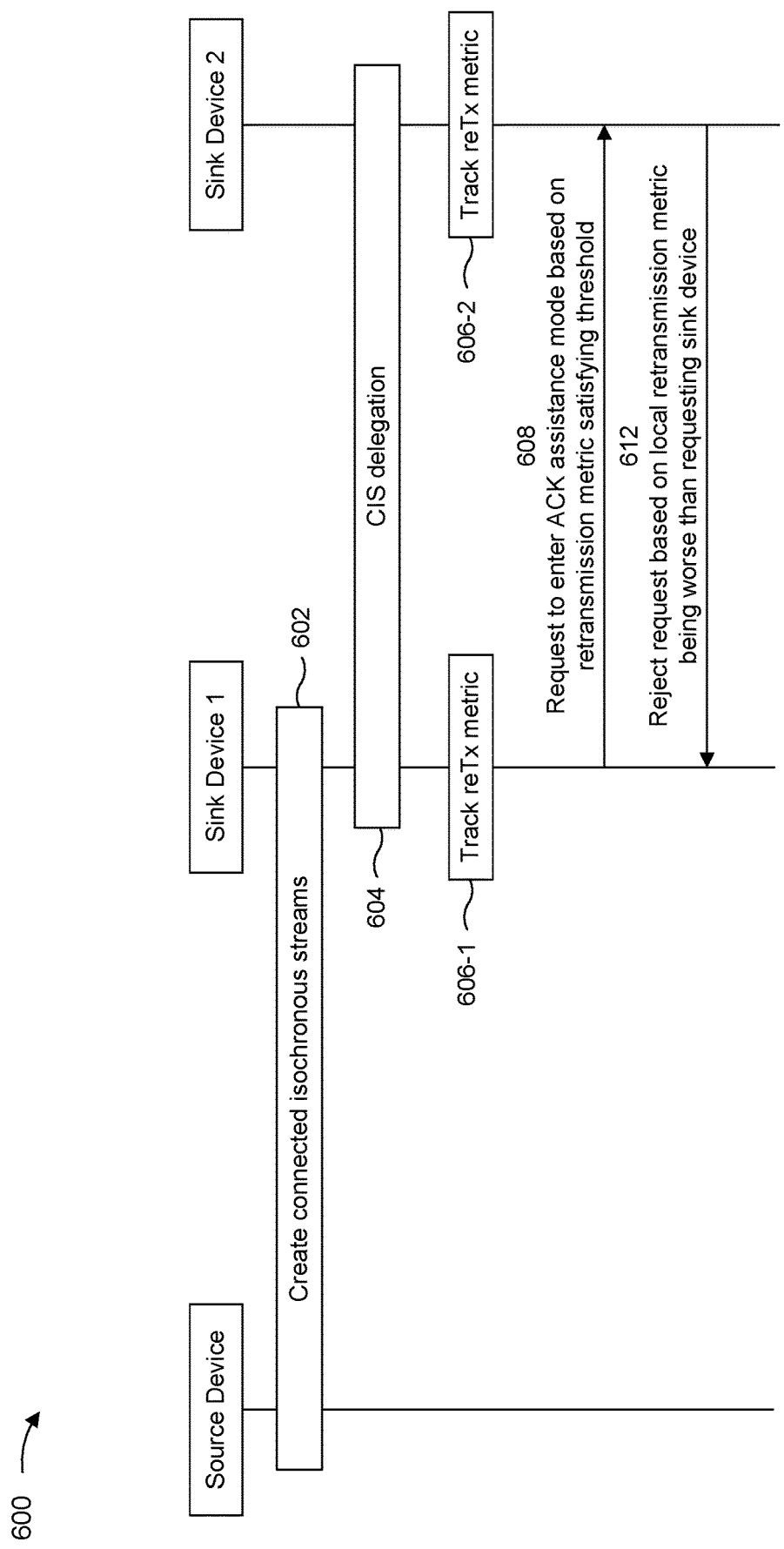

Alternatively, as shown in FIG. 6B, and by reference number 612, the second sink device may transmit, to the first sink device, a message that indicates a rejection of the request to enter the acknowledgement assistance mode. For example, in some aspects, the second sink device may reject the request to enter the acknowledgement assistance mode based on determining that the (local) retransmission metric of the second sink device is worse than the retransmission metric of the first sink device that is requesting acknowledgement assistance. For example, in some aspects, the second sink device may determine that the local retransmission metric of the second sink device is worse than the retransmission metric of the first sink device in cases where the average number of retransmissions received by the second sink device equals or exceeds (e.g., is not better than) the average number of retransmissions received by the first sink device and/or in cases where the RSSI observed by the second sink device is equal to or less than (e.g., is not better than) the RSSI observed by the second sink device over the moving time window.

Referring again to FIG. 6A, in cases where the second sink device accepts the request to enter the acknowledgement assistance mode, the second sink device may then start to operate in the acknowledgement assistance mode. For example, when the second sink device is operating in the acknowledgement assistance mode, the second sink device may listen for packets that the source device transmits on the CIS associated with the first sink device and the second sink device may further listen for acknowledgement packets that the first sink device transmits on the CIS associated with the first sink device. Accordingly, whenever the source device retransmits a packet that the second sink device knows (e.g., determines) has already been received and acknowledged by the first sink device, the second sink device may send an acknowledgement to the source device to prevent any further (unnecessary) retransmissions.

For example, as shown by reference number 614-1 in FIG. 6A, the source device may transmit a PDU on the CIS associated with the first sink device, where the PDU contains a packet associated with a particular identifier or sequence number N, which is received by the first sink device. Furthermore, as shown by reference number 614-2, the PDU that contains the packet is also received by the second sink device that is operating in the acknowledgement assistance mode. As shown by reference number 616-1, the first sink device may transmit an acknowledgement on the CIS associated with the first sink device to indicate that the packet was successfully received, but the acknowledgement is not received by the source device (e.g., shown by an "X" in FIG. 6A to indicate that the transmitted acknowledgement is not received by the source device). However, as shown by reference number 616-2, the acknowledgement sent by the first sink device is received by the second sink device operating in the acknowledgement assistance mode. Accordingly, at this point in time, the second sink device is aware that the first sink device has received the transmission of the packet associated with the identifier or sequence number N. However, because the source device did not receive the acknowledgement sent by the first sink device, the source device retransmits the PDU that contains the packet associated with the identifier or sequence number N on the CIS associated with the first sink device, as shown by reference number 618-1. Furthermore, because the second sink device operating in the acknowledgement assistance mode is listening for packets on the CIS associated with the first sink device, the retransmission of the PDU that contains the packet associated with the identifier or sequence number N is received at the second sink device, as shown by reference number 618-2. In this case, as shown by reference number 620, the second sink device transmits an acknowledgement to the source device on the CIS associated with the first sink device based on the previous acknowledgement of the packet by the first sink device, thereby preventing any further retransmissions of the packet that was already received by the first sink device.

In some aspects, one or more conditions may cause the second sink device to exit the acknowledgement assistance mode after the second sink device has entered and started to operate the acknowledgement assistance mode. For example, as shown by reference number 630 in FIG. 6C and FIG. 6D, the second sink device may be operating in the acknowledgement assistance mode after receiving an appropriate request from the first sink device (e.g., with a retransmission metric and/or RSSI that is worse than the retransmission metric and/or RSSI of the second sink device). In some aspects, as shown by reference number 632 in FIG. 6C, the first sink device may request that the second sink device exit the acknowledgement assistance mode based on an improvement of the retransmission metric tracked by the first sink device. For example, in some aspects, the first sink device may request that the second sink device exit the acknowledgement assistance mode based on the average number of retransmissions received by the first sink device over the moving time window crossing below a threshold and/or based on the RSSI observed by the first sink device crossing above a threshold. In such cases, as shown by reference number 634, the second sink device may transmit a message to the first sink device indicating that the request to exit the acknowledgement assistance mode is accepted. Additionally, or alternatively, as shown by reference number 636 in FIG. 6D, the second sink device may transmit a request to exit the acknowledgement assistance mode to the first sink device based on a worsening of the retransmission metric tracked by the second sink device. For example, in some aspects, the second sink device may transmit the request to exit the acknowledgement assistance mode based on the average number of retransmissions received by the second sink device over the moving time window crossing above a threshold and/or based on the RSSI observed by the second sink device crossing below a threshold. In such cases, as shown by reference number 638, the first sink device may transmit a message to the second sink device indicating that the request to exit the acknowledgement assistance mode is accepted. Additionally, or alternatively, the second sink device may transmit the request to exit the acknowledgement assistance mode and/or may autonomously exit the acknowledgement assistance mode in cases where the source device sends a threshold number of packets to the first sink device that are not acknowledged by the first sink device, indicating that the link between the source device and the first sink device is of poor quality. In any case, as shown by reference number 640 in FIG. 6C and FIG. 6D, the second sink device may exit the acknowledgement assistance mode and cease to listen for packets and/or acknowledgements and cease to transmit acknowledgements on the CIS associated with the first sink device.

Figure 6C:
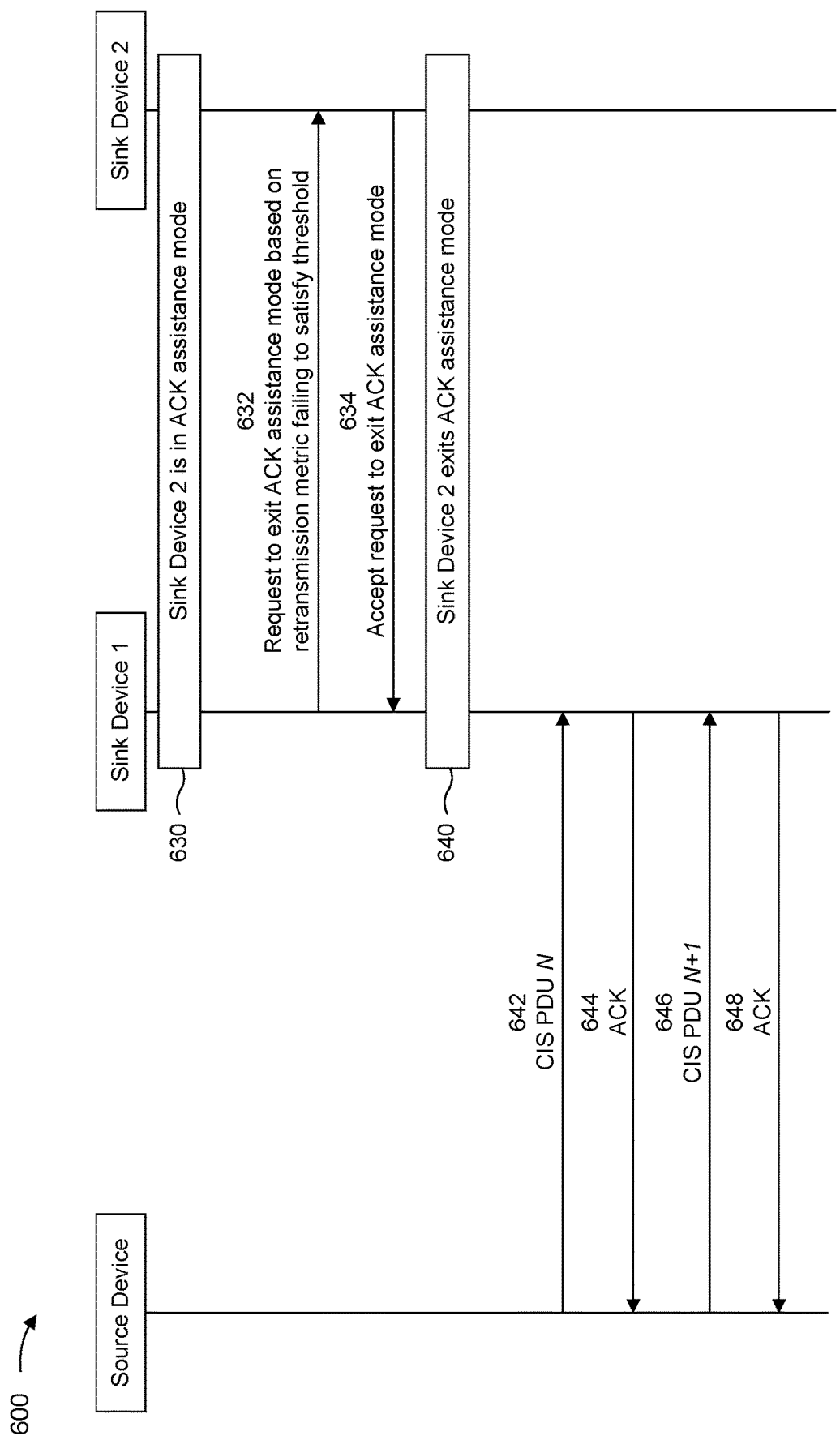
Figure 6D:
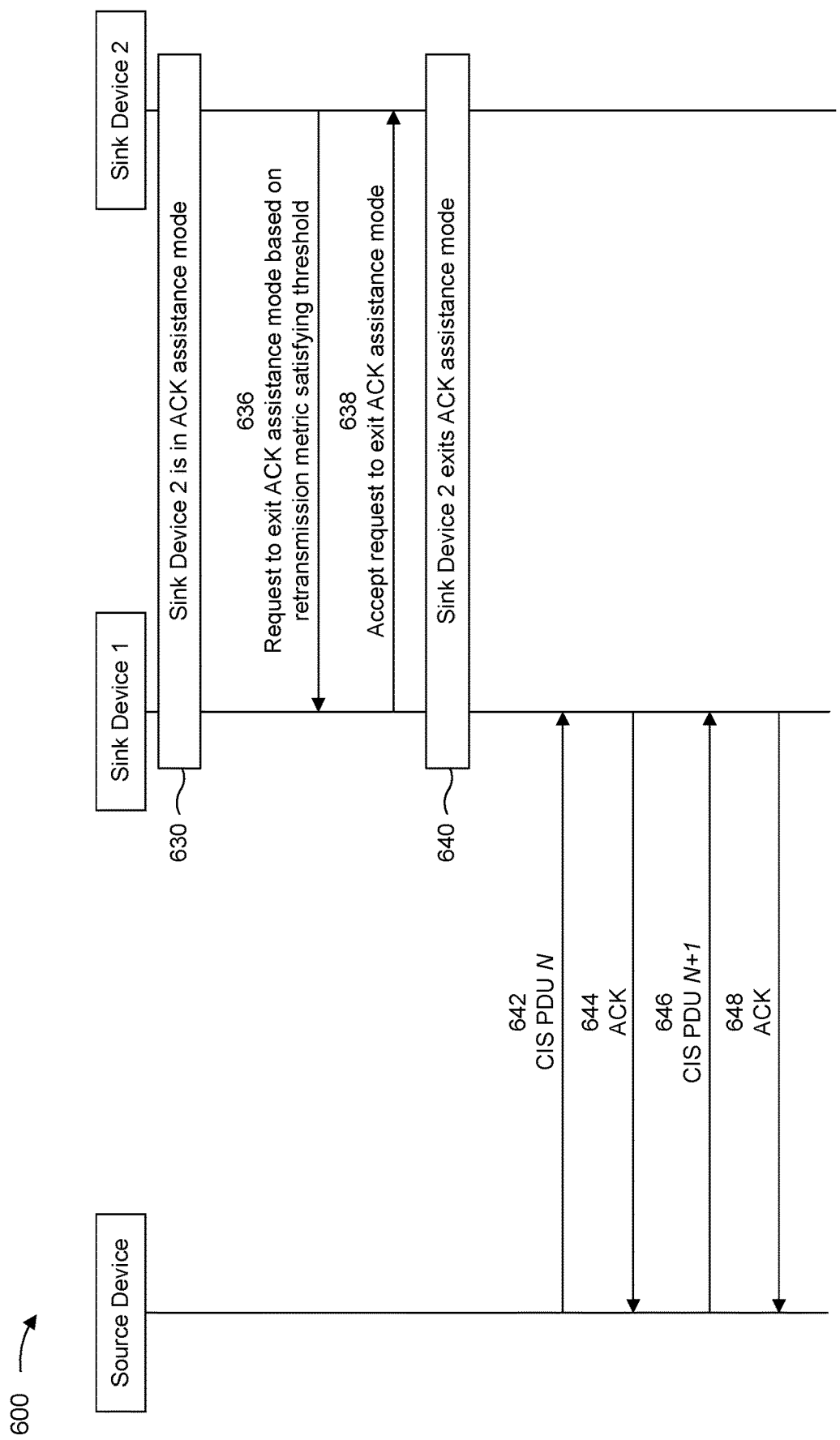
Figure 6E:
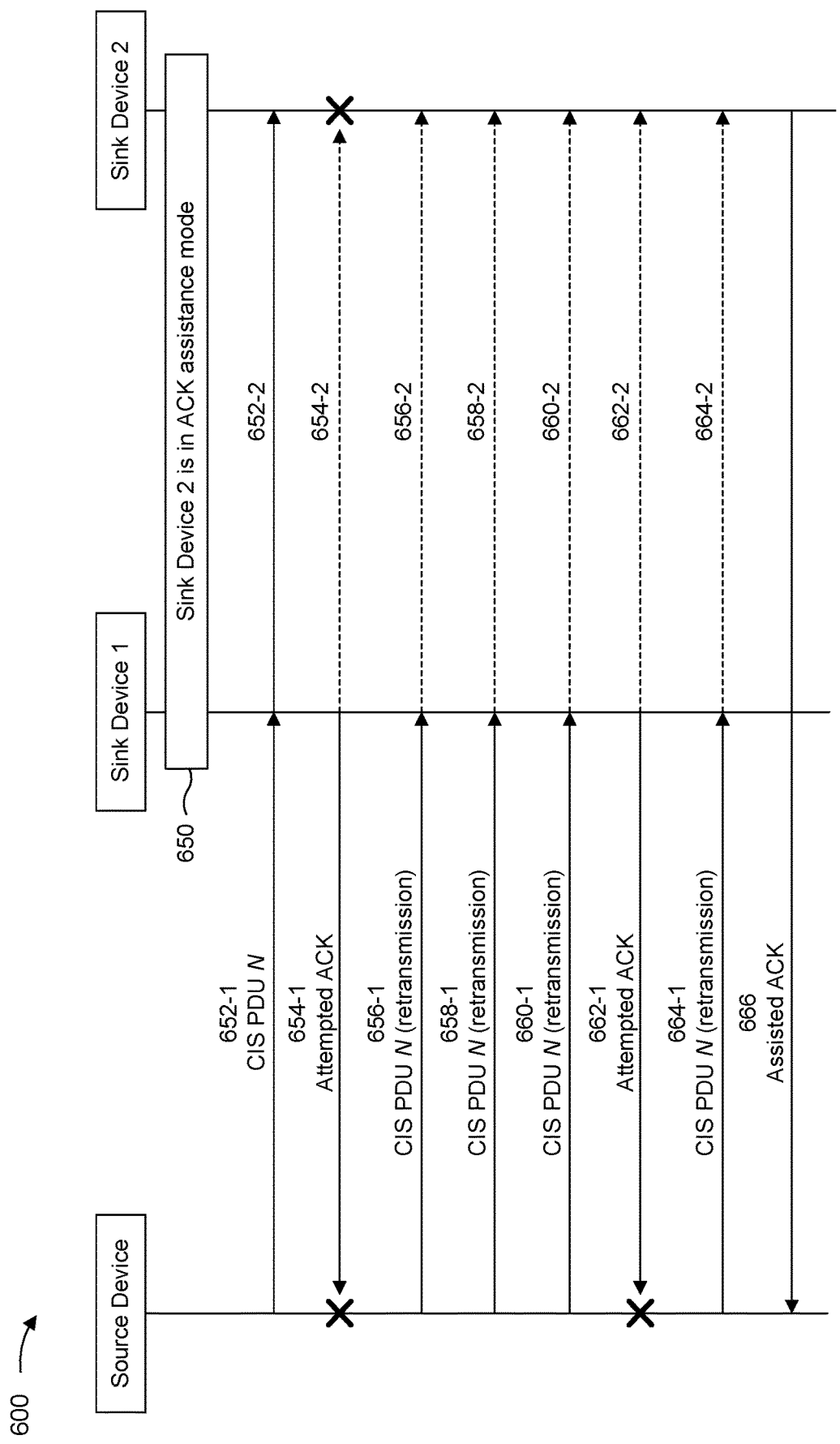

For example, as shown by reference number 642 in FIGS. 6C-6D, the source device may transmit a PDU on the CIS associated with the first sink device, where the PDU contains an packet associated with a particular identifier or sequence number N, which is received by the first sink device. As shown by reference number 644 in FIGS. 6D-6E, the first sink device may transmit an acknowledgement on the CIS associated with the first sink device to indicate that the packet was successfully received, and the acknowledgement is received by the source device. Accordingly, as shown by reference number 646 in FIGS. 6C-6D, the source device may transmit a PDU on the CIS associated with the first sink device, where the PDU contains a packet associated with an incremented identifier or sequence number N+1, which is received by the first sink device and subsequently acknowledged by the first sink device, as shown by reference number 648 in FIGS. 6C-6D. In this case, the first sink device and the second sink device may continue to track their respective local retransmission metrics and may subsequently request that the other sink device enter the acknowledgement assistance mode in a similar manner as described herein.

Furthermore, in various conditions, the first sink device may transmit an acknowledgement to the source device that is not detected by the second sink device while the second sink device is operating in the acknowledgement assistance mode. In such cases, the source device may retransmit the packet multiple times without the second sink device acknowledging the packet because the second sink device is not aware that the first sink device already acknowledged the packet. Accordingly, in such cases, the first sink device may transmit another acknowledgement to provide the source device and the second sink device another opportunity to receive the acknowledgement and prevent further retransmissions. For example, as shown by reference number 650 in FIG. 6E, the second sink device may be operating in the acknowledgement assistance mode after accepting a suitable request from the first sink device. In the illustrated example, the source device transmits a PDU associated with an identifier or sequence number N, which is received by the first sink device, as shown by reference number 652-1, and by the second sink device, as shown by reference number 652-2. As further shown in FIG. 6E, and by reference numbers 654-1 and 654-2, the first sink device attempts to send an acknowledgement for the packet, but the acknowledgement is not received by the source device or the second sink device.

Accordingly, as shown by reference numbers 656-1, 658-1, and 660-1, the source device retransmits the packet associated with the identifier or sequence number N multiple times, and each retransmission is received by the first sink device. Furthermore, as shown by reference numbers 656-2, 658-2, and 660-2, each retransmission of the packet associated with the identifier or sequence number N is received by the second sink device. However, the second sink device does not acknowledge any of the retransmissions because the second sink device did not receive the attempted acknowledgement associated with reference numbers 654-1 and 654-2. Accordingly, as shown by reference number 662-1 and 662-2, the first sink device transmits another acknowledgement for the packet based on the number of retransmissions of the packet satisfying (e.g., equaling or exceeding) a threshold. In the example shown in FIG. 6E, the second acknowledgement is received by the second sink device, but is not received by the source device. Accordingly, as shown by reference numbers 664-1 and 664-2, the source device sends another retransmission of the packet associated with the identifier or sequence number N, which is received by the first sink device and the second sink device. In this case, however, the second sink device is aware that the first sink device has acknowledged receipt of the packet associated with the identifier or sequence number N, whereby the second sink device transmits an assisted acknowledgement for the packet to the source device, as shown by reference number 666.

As indicated above, FIGS. 6A-6E are provided as examples. Other examples may differ from what is described with regard to FIGS. 6A-6E. For example, although some aspects are described herein with the first (connected) sink device requesting that the second (shadowing) sink device enter the acknowledgement assistance mode, the same or similar techniques may be applied in cases where the second (shadowing) sink device requests that the first (connected) sink device enter the acknowledgement assistance mode (e.g., in the CIS delegation mode). Alternatively, in cases where the source device and the sink devices are performing a wireless streaming use case that uses CIS mirroring, only the first (connected) sink device can request that the second (shadowing) sink device enter the acknowledgement assistance mode.

Figure 7A:
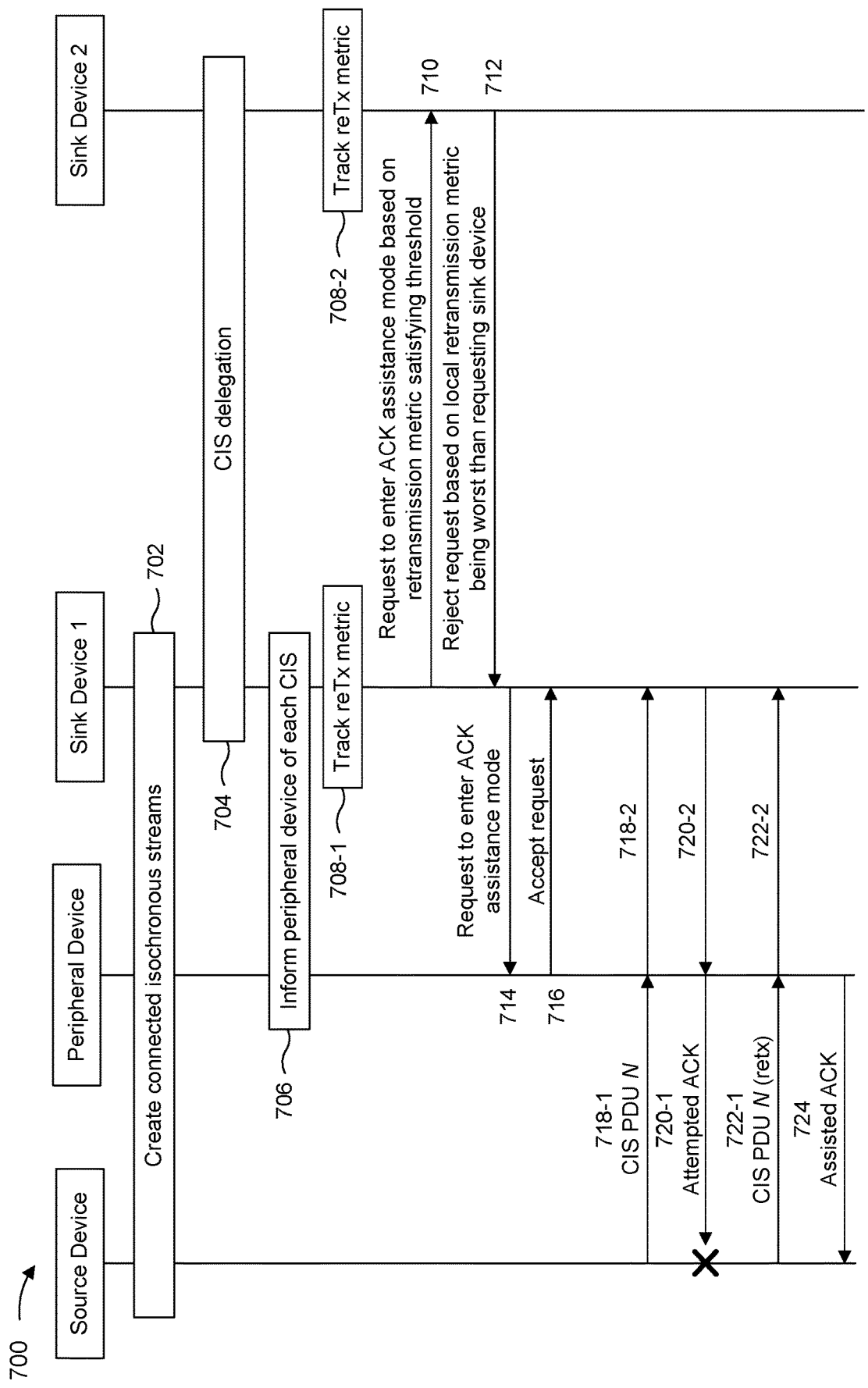
FIGS. 7A-7B are diagrams illustrating examples associated with assisted acknowledgment for wireless streaming, in accordance with the present disclosure.
Figure 7B:
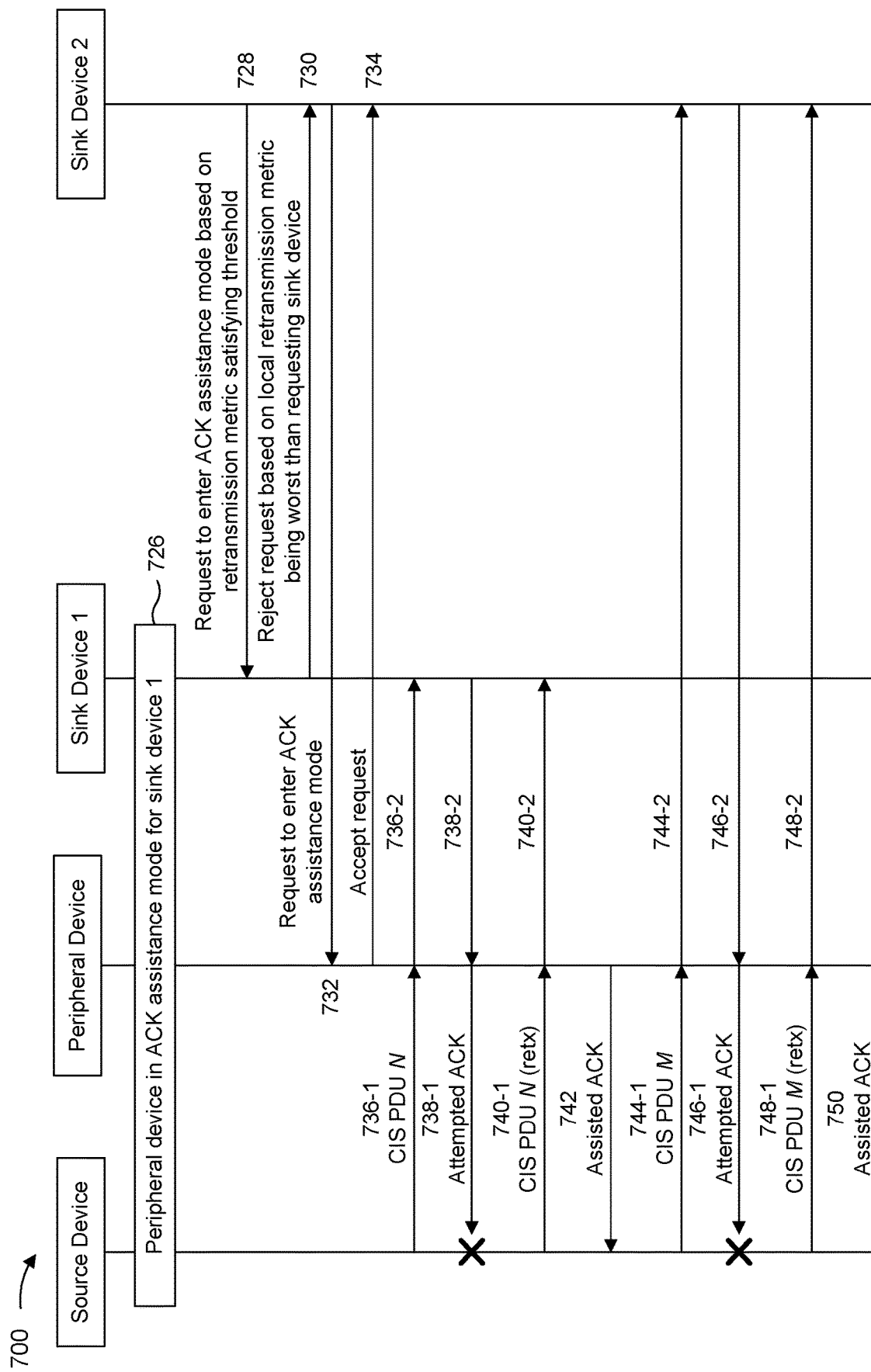

FIGS. 7A-7B are diagrams illustrating examples 700 associated with assisted acknowledgment for wireless streaming, in accordance with the present disclosure. As shown in FIGS. 7A-7B, examples 700 include communication between a source device (e.g., central device 102, wireless communication device 200, source device 410, or the like), multiple sink devices (e.g., peripheral devices 104, 106, 108, 110, 112, and/or 114, wireless communication device 200, sink device 420, or the like), and a peripheral device (e.g., a charging case for the sink devices or a smart watch paired with the sink devices and the source device). In some aspects, the source device, the sink devices, and the peripheral device may communicate in a WPAN, such as WPAN 100 or the like.

For example, in some aspects, the source device may correspond to a central device that transmits wireless streams to the multiple sink devices, such as a left earbud and a right earbud, and the peripheral device may correspond to an earbud case or a similar device in which the sink devices can be docked, inserted, or otherwise connected to charge or recharge the sink devices. In some cases, the peripheral device may have a larger battery than the sink devices (e.g., to hold energy that can be transferred to the sink devices), and may be equipped with one or more antennas and WPAN or other suitable wireless communication capabilities (e.g., to support a localization feature to assist a user with finding the peripheral device). Accordingly, as described herein, the peripheral device may act as an assisting wireless device that supports an acknowledgement assistance mode to transmit assisted acknowledgements to the source device when the source device retransmits packets that an assisted sink device has already received and acknowledged. In some aspects, in examples 700, the peripheral device may be aware of the streams that are established for each of the sink devices, and the peripheral device may be capable of receiving packets and transmitting acknowledgements on both streams (e.g., in connection with a CIS delegation or CIS mirroring feature). Accordingly, in addition to each sink device supporting operating in an acknowledgement assistance mode to transmit assisted acknowledgements to the source device (e.g., as described above with reference to FIGS. 6A-6E), the peripheral device can also support the acknowledgement assistance mode to transmit assisted acknowledgements to the source device on behalf of either or both sink devices. Furthermore, because the peripheral case has a larger battery than the sink devices, the peripheral case may transmit acknowledgements with a higher maximum transmit power than the sink devices, which can help to reduce unnecessary retransmissions, conserve bandwidth, conserve power, and/or increase an effective range of a wireless streaming use case.

For example, as shown in FIG. 7A, and by reference number 702, the source device may initially create a first CIS for the first sink device and a second CIS for the second sink device to transmit respective streams to the first sink device and the second sink device (e.g., left and right audio streams where the first sink device and the second sink device correspond to left and right wireless earbuds). As further shown in FIG. 7A, and by reference number 704, the first sink device and the second sink device may then communicate to enable CIS delegation for one or both CISs. For example, in cases where the source device and the sink devices are operating in a CIS delegation mode or a CIS mirroring mode, the first sink device may be designated as a connected peripheral (or connected sink) device, and the second sink device may be designated as a shadowing peripheral (or shadowing sink) device. In the CIS delegation mode, the source device may establish a first CIS for the first sink device and a second CIS for the second sink device, and the first (connected) sink device may communicate with the second (shadowing) sink device to delegate the second CIS to the second sink device (e.g., delegating responsibility for receiving data and transmitting acknowledgements for the second CIS to the second sink device). Furthermore, in some aspects, the first sink device may provide the second sink device with one or more parameters related to the first CIS (that is not delegated) such that the second sink device may subsequently receive data and transmit acknowledgements for the first CIS in cases where the second sink device is operating in the acknowledgement assistance mode. Alternatively, in some aspects, the first sink device may request that the second sink device mirror the first CIS in the CIS mirroring mode.

As further shown in FIG. 7A, and by reference number 706, the first (connected) sink device may then provide the peripheral device with information related to the first CIS associated with the first sink device and information related to the second CIS associated with the second sink device. In this way, when the peripheral device operates in the acknowledgement assistance mode, the peripheral device may use the CIS information provided by the first sink device to receive and/or detect packets that the source device transmits via the first CIS, packets that the source device transmits via the second CIS, acknowledgements that the first sink device transmits via the first CIS, and/or acknowledgements that the second sink device transmits via the second CIS.

As further shown in FIG. 7A, and by reference numbers 708-1 and 708-2, each sink device may track a retransmission metric based on a number of retransmissions that the respective sink device receives from the source device over time. For example, in some aspects, the retransmission metric that is tracked by each sink device may be a moving average of the number of retransmissions that the respective sink device received from the source device over a moving time window. Furthermore, in some aspects, the retransmissions that the sink devices track for calculating or otherwise determining the retransmission metric may be limited to retransmissions of packets that are received after an acknowledgement of the packet was transmitted (e.g., to exclude retransmissions that are expected to occur after the sink device fails to receive an initial transmission or a retransmission of a packet). Alternatively, in some aspects, the retransmissions that the sink devices track for calculating or otherwise determining the retransmission metric may include any retransmissions of packets regardless of whether the retransmissions occur after an acknowledgement of a packet that was successfully received (e.g., to provide a general metric related to a link quality between the sink device and the source). Additionally, or alternatively, the retransmission metric may be based on one or more measurements related to the link quality between the sink device and the source, such as an RSSI.

As further shown in FIG. 7A, and by reference number 710, the first sink device may transmit, to the second sink device, a request to enter the acknowledgement assistance mode based on the retransmission metric of the first sink device satisfying a threshold. For example, in some aspects, the retransmission metric of the first sink device may satisfy the threshold when the moving average of the number of retransmissions received by the first sink device equals or exceeds the threshold over a moving time window. Additionally, or alternatively, in some aspects, the retransmission metric of the first sink device may satisfy the threshold when the RSSI observed by the first sink device is equal to or less than the threshold. Additionally, or alternatively, in other examples, the retransmission metric may be based on multiple factors, such as applying a weight to the moving average of the number of retransmissions received by the first sink device over a moving time window based on the average RSSI observed by the first sink device over the moving time window (e.g., where a relatively higher RSSI may result in a relatively lower value for the retransmission metric). In any case, when the retransmission metric satisfies the applicable threshold, indicating that the source device may not be receiving or may be unable to reliably receive acknowledgements from the first sink device, the first sink device may request that the second sink device enter the acknowledgement assistance mode to assist with sending acknowledgements to the source device. For example, in some aspects, the request may be included in a PDU that contains an identifier of the first sink device, an identifier of the CIS associated with the first sink device, a flag that indicates whether the request is to enter or exit the acknowledgement assistance mode, and one or more fields that relate to the retransmission metric (e.g., the one or more fields may indicate the moving average of the number of retransmissions received over the moving time window and/or the RSSI observed over the moving time window, among other examples).

As further shown in FIG. 7A, and by reference number 712, the second sink device may transmit, to the first sink device, a message that indicates a rejection of the request to enter the acknowledgement assistance mode. For example, in some aspects, the second sink device may reject the request to enter the acknowledgement assistance mode based on determining that the (local) retransmission metric of the second sink device is worse than the retransmission metric of the first sink device that is requesting acknowledgement assistance. For example, in some aspects, the second sink device may determine that the local retransmission metric of the second sink device is worse than the retransmission metric of the first sink device in cases where the average number of retransmissions received by the second sink device equals or exceeds (e.g., is not better than) the average number of retransmissions received by the first sink device and/or in cases where the RSSI observed by the second sink device is equal to or less than (e.g., is not better than) the RSSI observed by the second sink device over the moving time window.

As further shown in FIG. 7A, and by reference number 714, the first sink device may transmit, to the peripheral device, a request to enter the acknowledgement assistance mode based on the second sink device rejecting the request to enter the acknowledgement assistance mode. In some aspects, the request transmitted to the peripheral device may indicate the RSSI observed by the first sink device over the moving time window, and the peripheral device may compare the RSSI observed by the first sink device with an RSSI observed by the peripheral device (e.g., for packets transmitted by the source device) to determine whether to enter the acknowledgement assistance mode. For example, as shown by reference number 716, the peripheral device may transmit, to the first sink device, a message that indicates an acceptance of the request to enter the acknowledgement assistance mode based on determining that the (local) retransmission metric of the peripheral device is better than the retransmission metric of the first sink device that is requesting acknowledgement assistance (e.g., the RSSI observed by the peripheral device is higher than the RSSI observed by the first sink device). Alternatively, in some aspects, the peripheral device may transmit, to the first sink device, a message that indicates a rejection of the request to enter the acknowledgement assistance mode based on determining that the local retransmission metric of the peripheral device is worse or not better than the retransmission metric of the first sink device requesting acknowledgement assistance (e.g., the RSSI observed by the peripheral device is equal to or less than the RSSI observed by the first sink device).

In some aspects, in cases where the peripheral device accepts the request to enter the acknowledgement assistance mode, the peripheral device may then start to operate in the acknowledgement assistance mode. For example, when the peripheral device is operating in the acknowledgement assistance mode, the peripheral device may listen for packets that the source device transmits on the CIS associated with the first sink device and the peripheral device may further listen for acknowledgement packets that the first sink device transmits on the CIS associated with the first sink device. Accordingly, whenever the source device retransmits a packet that the peripheral device knows (e.g., determines) has already been received and acknowledged by the first sink device, the peripheral device may send an acknowledgement to the source device to prevent any further (unnecessary) retransmissions.

For example, as shown by reference number 718-1 in FIG. 7A, the source device may transmit a PDU on the CIS associated with the first sink device, where the PDU contains a packet associated with a particular identifier or sequence number N, which is received by the peripheral device operating in the acknowledgement assistance mode. Furthermore, as shown by reference number 718-2, the PDU that contains the packet is also received by the first sink device. As shown by reference number 720-1, the first sink device may transmit an acknowledgement on the CIS associated with the first sink device to indicate that the packet was successfully received, but the acknowledgement is not received by the source device (e.g., shown by an "X" in FIG. 7A to indicate that the transmitted acknowledgement is not received by the source device). However, as shown by reference number 720-2, the acknowledgement sent by the first sink device is received by the peripheral device operating in the acknowledgement assistance mode. Accordingly, at this point in time, the peripheral device is aware that the first sink device has received the transmission of the packet associated with the identifier or sequence number N. However, because the source device did not receive the acknowledgement sent by the first sink device, the source device retransmits the PDU that contains the packet associated with the identifier or sequence number N on the CIS associated with the first sink device, as shown by reference numbers 722-1 and 722-2. In this case, as shown by reference number 724, the peripheral device transmits an assisted acknowledgement to the source device on the CIS associated with the first sink device based on the previous acknowledgement of the packet by the first sink device, thereby preventing further retransmissions of the packet that was already received and acknowledged by the first sink device.

Furthermore, in some aspects, the peripheral device may operate in the acknowledgement assistance mode for the first sink device only, for the second sink device, or for both the first sink device and the second sink device. For example, FIG. 7B depicts an example call flow that may result in the peripheral device acting in the acknowledgement assistance mode for both sink devices. As shown in FIG. 7B, and by reference number 726, the peripheral device may be operating in the acknowledgement assistance mode for the first sink device.

As further shown in FIG. 7B, and by reference number 728, the second sink device may transmit, to the first sink device, a request to enter the acknowledgement assistance mode based on the retransmission metric of the second sink device satisfying a threshold. For example, in some aspects, the retransmission metric of the first sink device may satisfy the threshold when the moving average of the number of retransmissions received by the second sink device equals or exceeds the threshold over a moving time window and/or the RSSI observed by the second sink device is equal to or less than the threshold. Additionally, or alternatively, in other examples, the retransmission metric may be based on multiple factors, as described above.

As further shown in FIG. 7B, and by reference number 730, the first sink device may transmit, to the second sink device, a message that indicates a rejection of the request to enter the acknowledgement assistance mode. For example, in some aspects, the first sink device may reject the request to enter the acknowledgement assistance mode based on determining that the (local) retransmission metric of the first sink device is worse than the retransmission metric of the second sink device that is requesting acknowledgement assistance.

As further shown in FIG. 7B, and by reference number 732, the second sink device may transmit, to the peripheral device, a request to enter the acknowledgement assistance mode based on the first sink device rejecting the request to enter the acknowledgement assistance mode. In some aspects, the request transmitted to the peripheral device may indicate the RSSI observed by the second sink device over the moving time window, and the peripheral device may compare the RSSI observed by the second sink device with the RSSI observed by the peripheral device (e.g., for packets transmitted by the source device) to determine whether to enter the acknowledgement assistance mode. For example, as shown by reference number 734, the peripheral device may transmit, to the second sink device, a message that indicates an acceptance of the request to enter the acknowledgement assistance mode based on determining that the (local) retransmission metric of the peripheral device is better than the retransmission metric of the first sink device that is requesting acknowledgement assistance (e.g., the RSSI observed by the peripheral device is higher than the RSSI observed by the second sink device). Alternatively, in some aspects, the peripheral device may transmit, to the second sink device, a message that indicates a rejection of the request to enter the acknowledgement assistance mode based on determining that the local retransmission metric of the peripheral device is worse or not better than the retransmission metric of the first sink device requesting acknowledgement assistance.

In some aspects, in cases where the peripheral device accepts the request to enter the acknowledgement assistance mode for the second sink device, the peripheral device may then operate in the acknowledgement assistance mode for both sink devices. For example, when the peripheral device is operating in the acknowledgement assistance mode for both sink devices, the peripheral device may listen for packets that the source device transmits on the CIS associated with the first sink device, may listen for acknowledgement packets that the first sink device transmits on the CIS associated with the first sink device, may listen for packets that the source device transmits on the CIS associated with the second sink device, and may listen for acknowledgement packets that the second sink device transmits on the CIS associated with the second sink device. Accordingly, whenever the source device retransmits a packet that the peripheral device knows (e.g., determines) has already been received and acknowledged by the first sink or the second sink device, the peripheral device may send an acknowledgement to the source device to prevent any further (unnecessary) retransmissions.

For example, as shown by reference number 736-1 in FIG. 7B, the source device may transmit a PDU on the CIS associated with the first sink device, where the PDU contains a packet associated with a particular identifier or sequence number N, which is received by the peripheral device operating in the acknowledgement assistance mode. Furthermore, as shown by reference number 736-2, the PDU that contains the packet is also received by the first sink device. As shown by reference number 738-1, the first sink device may transmit an acknowledgement on the CIS associated with the first sink device to indicate that the packet was successfully received, but the acknowledgement is not received by the source device. However, as shown by reference number 738-2, the acknowledgement sent by the first sink device is received by the peripheral device operating in the acknowledgement assistance mode. Accordingly, at this point in time, the peripheral device is aware that the first sink device has received the transmission of the packet associated with the identifier or sequence number N. However, because the source device did not receive the acknowledgement sent by the first sink device, the source device retransmits the PDU that contains the packet associated with the identifier or sequence number N on the CIS associated with the first sink device, as shown by reference numbers 740-1 and 740-2. In this case, as shown by reference number 742, the peripheral device transmits an assisted acknowledgement to the source device on the CIS associated with the first sink device based on the previous acknowledgement of the packet by the first sink device, thereby preventing further retransmissions of the packet that was already received and acknowledged by the first sink device.

Furthermore, as shown by reference number 744-1 in FIG. 7B, the source device may transmit a PDU on the CIS associated with the second sink device, where the PDU contains a packet associated with a particular identifier or sequence number M, which is received by the peripheral device operating in the acknowledgement assistance mode. Furthermore, as shown by reference number 744-2, the PDU that contains the packet is also received by the second sink device. As shown by reference number 746-1, the second sink device may transmit an acknowledgement on the CIS associated with the second sink device to indicate that the packet was successfully received, but the acknowledgement is not received by the source device. However, as shown by reference number 746-2, the acknowledgement sent by the second sink device is received by the peripheral device operating in the acknowledgement assistance mode. Accordingly, at this point in time, the peripheral device is aware that the second sink device has received the transmission of the packet associated with the identifier or sequence number M. However, because the source device did not receive the acknowledgement sent by the second sink device, the source device retransmits the PDU that contains the packet associated with the identifier or sequence number M on the CIS associated with the second sink device, as shown by reference numbers 748-1 and 748-2. In this case, as shown by reference number 750, the peripheral device transmits an assisted acknowledgement to the source device on the CIS associated with the second sink device based on the previous acknowledgement of the packet by the second sink device.

As indicated above, FIGS. 7A-7B are provided as examples. Other examples may differ from what is described with regard to FIGS. 7A-7B.

Figure 8:
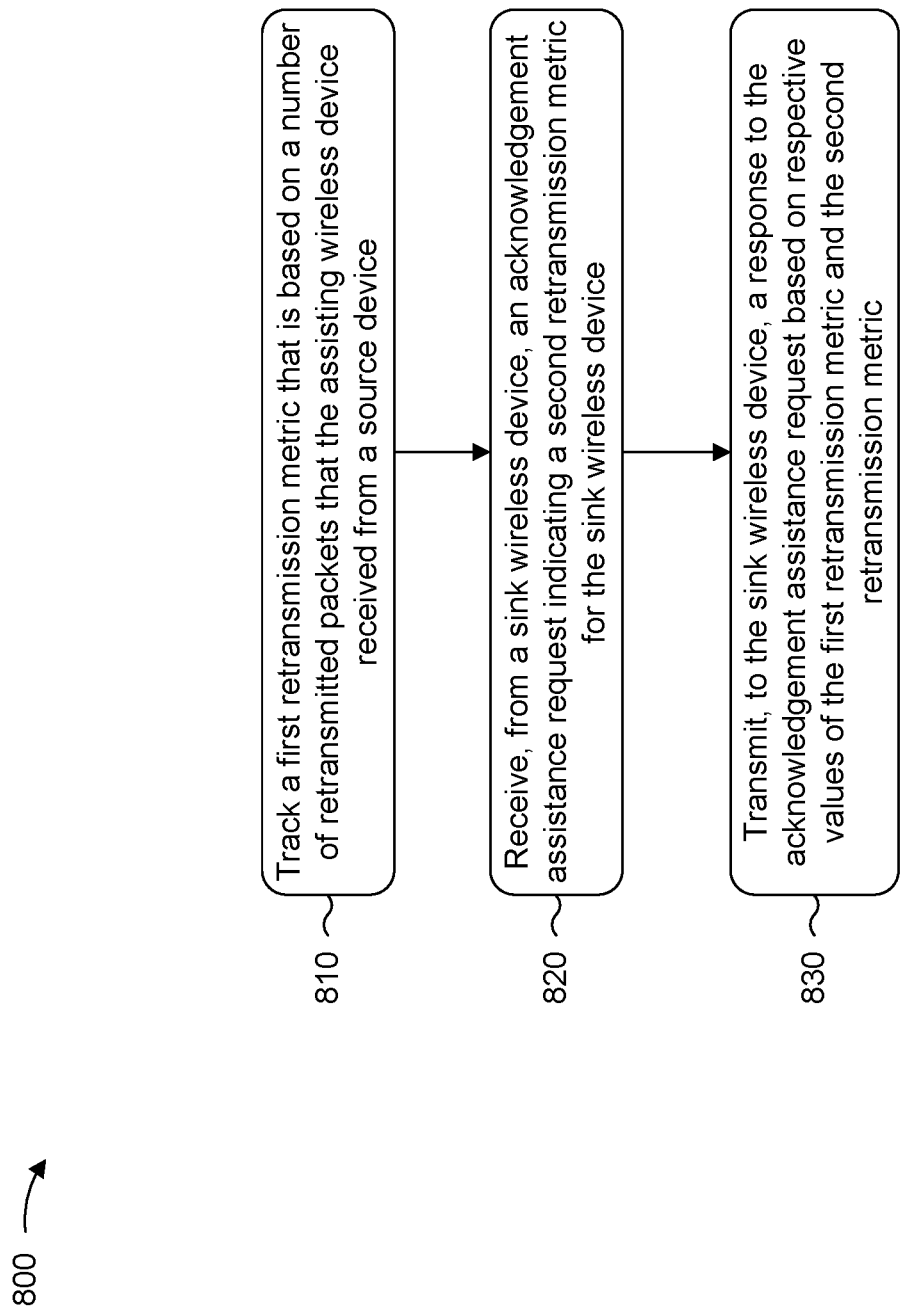
FIGS. 8-9 are diagrams illustrating example processes associated with assisted acknowledgment for wireless streaming, in accordance with the present disclosure.

FIG. 8 is a diagram illustrating an example process 800 performed, for example, by an assisting wireless device, in accordance with the present disclosure. Example process 800 is an example where the assisting wireless device performs operations associated with assisted acknowledgement for wireless streaming.

As shown in FIG. 8, in some aspects, process 800 may include tracking a first retransmission metric that is based on a number of retransmitted packets that the assisting wireless device received from a source device (block 810). For example, the assisting wireless device (e.g., using communication manager 1006, depicted in FIG. 10) may track a first retransmission metric that is based on a number of retransmitted packets that the assisting wireless device received from a source device, as described above.

As further shown in FIG. 8, in some aspects, process 800 may include receiving, from a sink wireless device, an acknowledgement assistance request indicating a second retransmission metric for the sink wireless device (block 820). For example, the assisting wireless device (e.g., using reception component 1002 and/or communication manager 1006, depicted in FIG. 10) may receive, from a sink wireless device, an acknowledgement assistance request indicating a second retransmission metric for the sink wireless device, as described above.

As further shown in FIG. 8, in some aspects, process 800 may include transmitting, to the sink wireless device, a response to the acknowledgement assistance request based on respective values of the first retransmission metric and the second retransmission metric (block 830). For example, the assisting wireless device (e.g., using transmission component 1004 and/or communication manager 1006, depicted in FIG. 10) may transmit, to the sink wireless device, a response to the acknowledgement assistance request based on respective values of the first retransmission metric and the second retransmission metric, as described above.

Process 800 may include additional aspects, such as any single aspect or any combination of aspects described below and/or in connection with one or more other processes described elsewhere herein.

In a first aspect, the first retransmission metric and the second retransmission metric are moving averages that are based on the number of retransmitted packets, received from the source device over a time period, subsequent to an acknowledgement transmission to the source device.

In a second aspect, alone or in combination with the first aspect, the response is a rejection of the acknowledgement assistance request based on the value of the first retransmission metric being worse than the value of the second retransmission metric.

In a third aspect, alone or in combination with one or more of the first and second aspects, the response is an acceptance of the acknowledgement assistance request based on the value of the second retransmission metric being worse than the value of the first retransmission metric.

In a fourth aspect, alone or in combination with one or more of the first through third aspects, process 800 includes operating in an acknowledgement assistance mode for the sink wireless device based on the acceptance of the acknowledgement assistance request.

In a fifth aspect, alone or in combination with one or more of the first through fourth aspects, operating in the acknowledgement assistance mode for the sink wireless device includes detecting a first acknowledgement transmitted by the sink wireless device for a packet transmitted from the source device to the sink wireless device, and transmitting, to the source device, a second acknowledgement for the packet based on detecting a retransmission of the packet from the source device to the sink wireless device subsequent to the first acknowledgement.

In a sixth aspect, alone or in combination with one or more of the first through fifth aspects, process 800 includes exiting the acknowledgement assistance mode based on the value of the first retransmission metric for the assisting wireless device satisfying a threshold.

In a seventh aspect, alone or in combination with one or more of the first through sixth aspects, process 800 includes exiting the acknowledgement assistance mode based on a message, received from the sink wireless device, requesting that the assisting wireless device exit the acknowledgement assistance mode.

In an eighth aspect, alone or in combination with one or more of the first through seventh aspects, process 800 includes exiting the acknowledgement assistance mode based on detecting a threshold number of packet transmissions from the source device to the sink wireless device that are not acknowledged by the sink wireless device.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
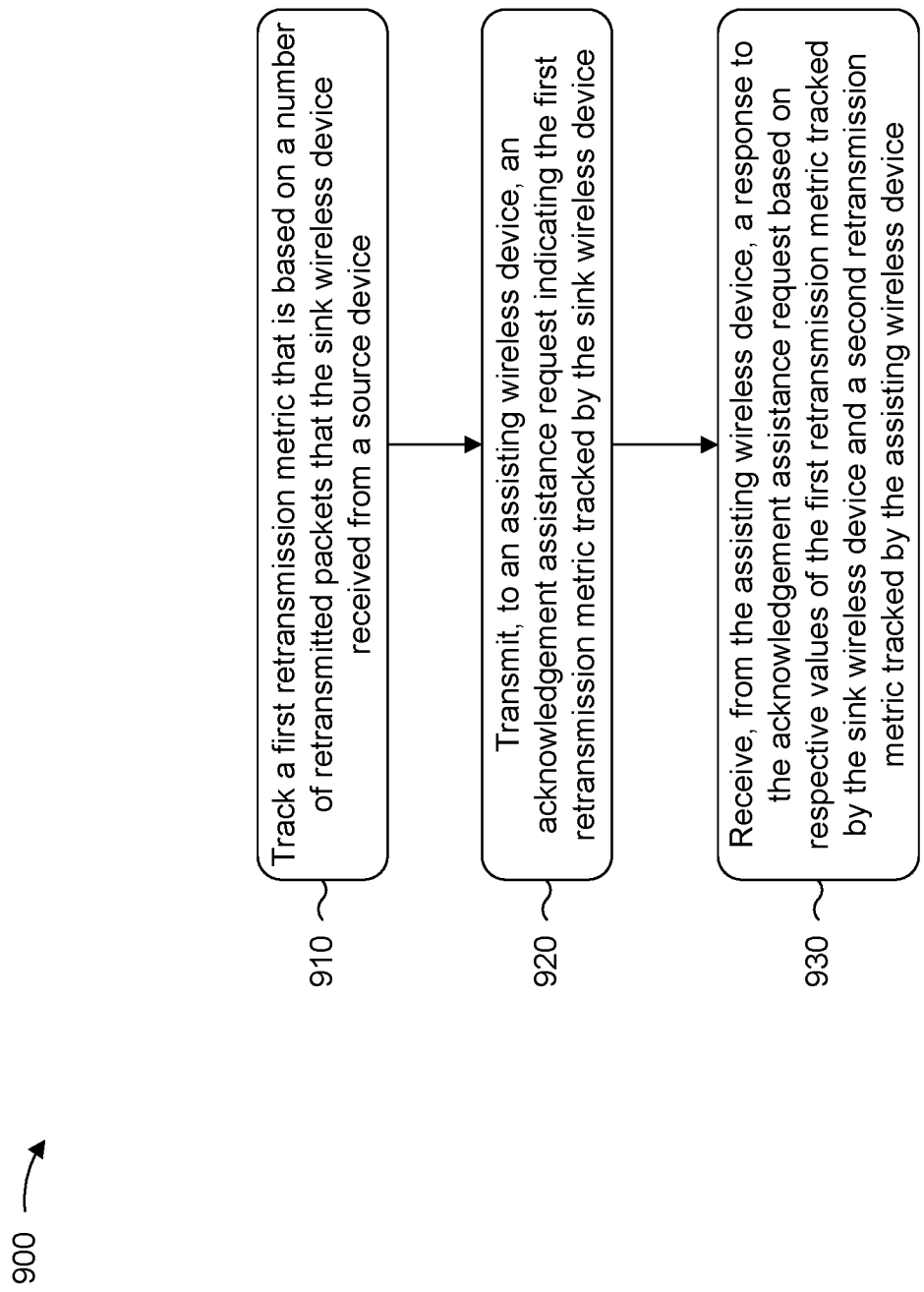

FIG. 9 is a diagram illustrating an example process 900 performed, for example, by a sink wireless device, in accordance with the present disclosure. Example process 900 is an example where the sink wireless device performs operations associated with assisted acknowledgement for wireless streaming.

As shown in FIG. 9, in some aspects, process 900 may include tracking a first retransmission metric that is based on a number of retransmitted packets that the sink wireless device received from a source device (block 910). For example, the sink wireless device (e.g., using communication manager 1106, depicted in FIG. 11) may track a first retransmission metric that is based on a number of retransmitted packets that the sink wireless device received from a source device, as described above.

As further shown in FIG. 9, in some aspects, process 900 may include transmitting, to an assisting wireless device, an acknowledgement assistance request indicating the first retransmission metric tracked by the sink wireless device (block 920). For example, the sink wireless device (e.g., using transmission component 1104 and/or communication manager 1106, depicted in FIG. 11) may transmit, to an assisting wireless device, an acknowledgement assistance request indicating the first retransmission metric tracked by the sink wireless device, as described above.

As further shown in FIG. 9, in some aspects, process 900 may include receiving, from the assisting wireless device, a response to the acknowledgement assistance request based on respective values of the first retransmission metric tracked by the sink wireless device and a second retransmission metric tracked by the assisting wireless device (block 930). For example, the sink wireless device (e.g., using reception component 1102 and/or communication manager 1106, depicted in FIG. 11) may receive, from the assisting wireless device, a response to the acknowledgement assistance request based on respective values of the first retransmission metric tracked by the sink wireless device and a second retransmission metric tracked by the assisting wireless device, as described above.

Process 900 may include additional aspects, such as any single aspect or any combination of aspects described below and/or in connection with one or more other processes described elsewhere herein.

In a first aspect, the first retransmission metric and the second retransmission metric are moving averages that are based on the number of retransmitted packets, received from the source device over a time period, subsequent to an acknowledgement transmission to the source device.

In a second aspect, alone or in combination with the first aspect, the response is a rejection of the acknowledgement assistance request based on the value of the second retransmission metric being worse than the value of the first retransmission metric.

In a third aspect, alone or in combination with one or more of the first and second aspects, the response is an acceptance of the acknowledgement assistance request based on the value of the first retransmission metric being worse than the value of the second retransmission metric.

In a fourth aspect, alone or in combination with one or more of the first through third aspects, process 900 includes transmitting, to the assisting wireless device, a message requesting that the assisting wireless device exit an acknowledgement assistance mode based on an updated value of the first retransmission metric failing to satisfy a threshold.

In a fifth aspect, alone or in combination with one or more of the first through fourth aspects, process 900 includes receiving, from the source device, one or more retransmissions of a packet subsequent to transmitting a first acknowledgement for the packet, and transmitting a second acknowledgement for the packet based on a number of the one or more retransmissions of the packet satisfying a threshold.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
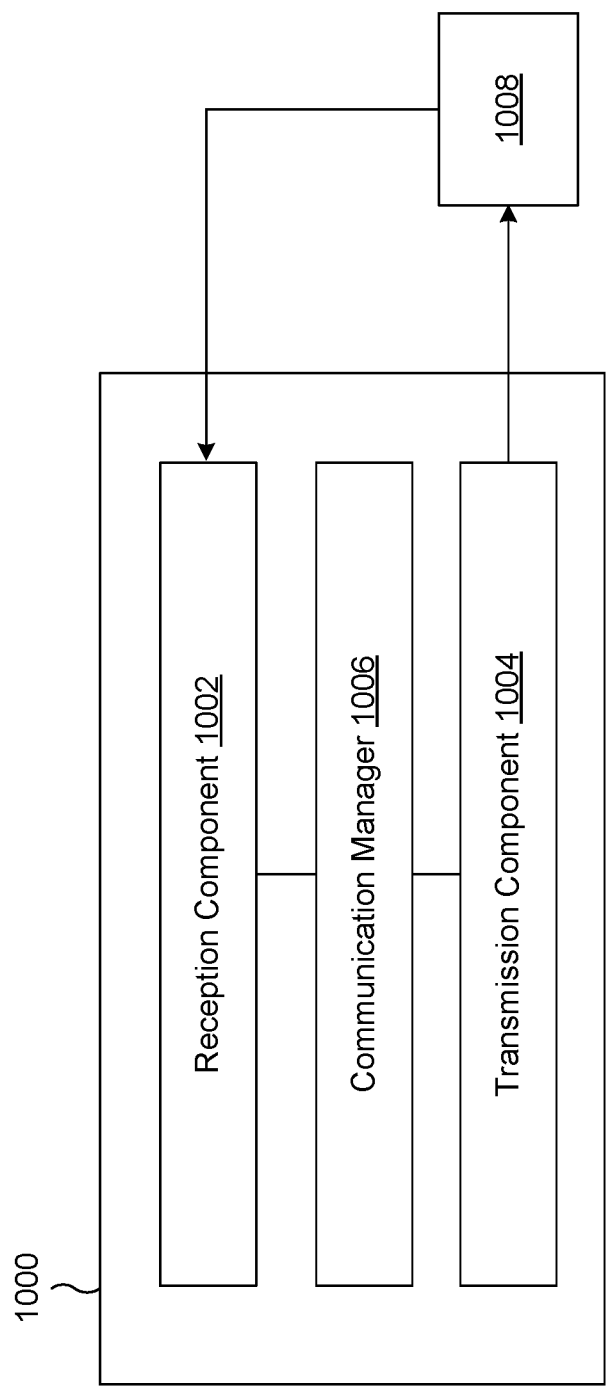
FIGS. 10-11 are diagrams of example apparatuses for wireless communication, in accordance with the present disclosure.

FIG. 10 is a diagram of an example apparatus 1000 for wireless communication, in accordance with the present disclosure. The apparatus 1000 may be a wireless communication device, or a wireless communication device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1008 (such as a peripheral device and/or another wireless communication device) using the reception component 1002 and the transmission component 1004. As further shown, the apparatus 1000 may include the communication manager 1006.

In some aspects, the apparatus 1000 may be configured to perform one or more operations described herein. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the device described in connection with FIG. 2 and/or FIG. 3. Additionally, or alternatively, one or more components shown in FIG. 10 may be implemented within one or more components described in connection with FIG. 2 and/or FIG. 3. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a multiple input multiple output (MIMO) detector, a receive processor, a controller/ processor, a memory, or a combination thereof, of the wireless communication device.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the wireless communication device. In some aspects, the transmission component 1004 may be co-located with the reception component 1002 in a transceiver.

The communication manager 1006 may track a first retransmission metric that is based on a number of retransmitted packets that the assisting wireless device received from a source device. The reception component 1002 may receive, from a sink wireless device, an acknowledgement assistance request indicating a second retransmission metric for the sink wireless device. The transmission component 1004 may transmit, to the sink wireless device, a response to the acknowledgement assistance request based on respective values of the first retransmission metric and the second retransmission metric.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
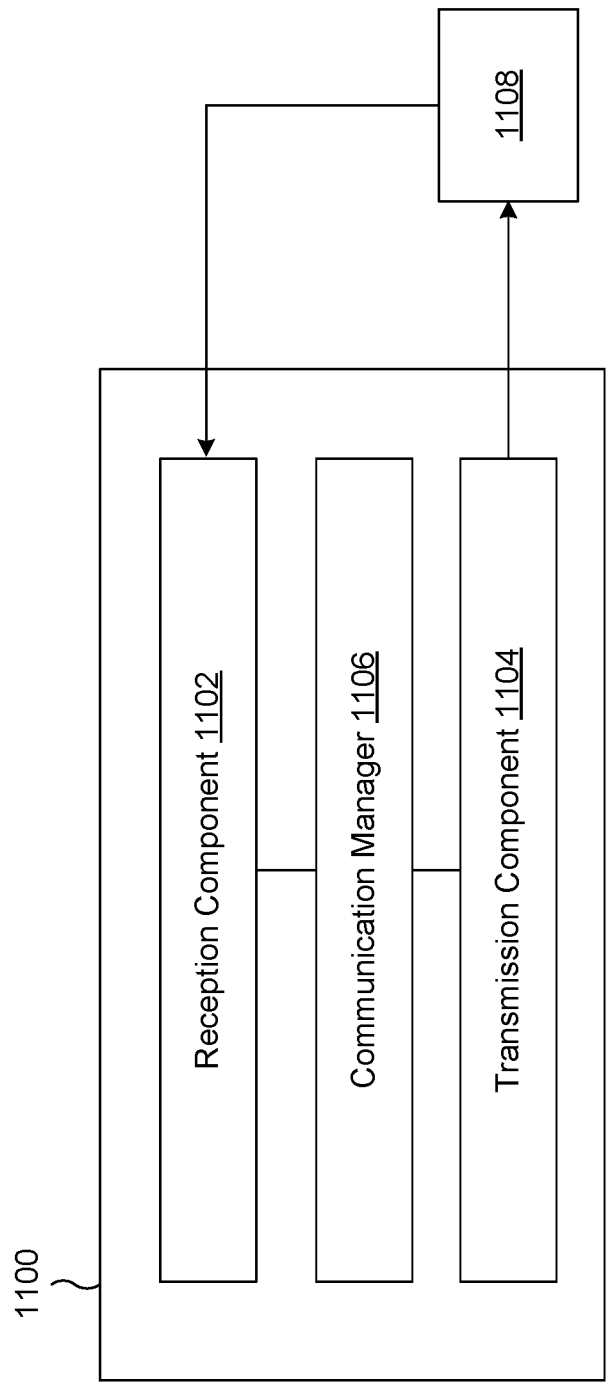

FIG. 11 is a diagram of an example apparatus 1100 for wireless communication, in accordance with the present disclosure. The apparatus 1100 may be a wireless communication device, or a wireless communication device may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1108 (such as a peripheral device and/or another wireless communication device) using the reception component 1102 and the transmission component 1104. As further shown, the apparatus 1100 may include the communication manager 1106.

In some aspects, the apparatus 1100 may be configured to perform one or more operations described herein. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the device described in connection with FIG. 2 and/or FIG. 3. Additionally, or alternatively, one or more components shown in FIG. 11 may be implemented within one or more components described in connection with FIG. 2 and/or FIG. 3. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the wireless communication device.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the wireless communication device. In some aspects, the transmission component 1104 may be co-located with the reception component 1102 in a transceiver.

The communication manager 1106 may track a first retransmission metric that is based on a number of retransmitted packets that the sink wireless device received from a source device. The transmission component 1104 may transmit, to an assisting wireless device, an acknowledgement assistance request indicating the first retransmission metric tracked by the sink wireless device. The reception component 1102 may receive, from the assisting wireless device, a response to the acknowledgement assistance request based on respective values of the first retransmission metric tracked by the sink wireless device and a second retransmission metric tracked by the assisting wireless device.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by an assisting wireless device, comprising: tracking a first retransmission metric that is based on a number of retransmitted packets that the assisting wireless device received from a source device; receiving, from a sink wireless device, an acknowledgement assistance request indicating a second retransmission metric for the sink wireless device; and transmitting, to the sink wireless device, a response to the acknowledgement assistance request based on respective values of the first retransmission metric and the second retransmission metric.

Aspect 2: The method of Aspect 1, wherein the first retransmission metric and the second retransmission metric are moving averages that are based on the number of retransmitted packets, received from the source device over a time period, subsequent to an acknowledgement transmission to the source device.

Aspect 3: The method of any of Aspects 1-2, wherein the response is a rejection of the acknowledgement assistance request based on the value of the first retransmission metric being worse than the value of the second retransmission metric.

Aspect 4: The method of any of Aspects 1-3, wherein the response is an acceptance of the acknowledgement assistance request based on the value of the second retransmission metric being worse than the value of the first retransmission metric.

Aspect 5: The method of Aspect 4, further comprising: operating in an acknowledgement assistance mode for the sink wireless device based on the acceptance of the acknowledgement assistance request.

Aspect 6: The method of Aspect 5, wherein operating in the acknowledgement assistance mode for the sink wireless device includes: detecting a first acknowledgement transmitted by the sink wireless device for a packet transmitted from the source device to the sink wireless device; and transmitting, to the source device, a second acknowledgement for the packet based on detecting a retransmission of the packet from the source device to the sink wireless device subsequent to the first acknowledgement.

Aspect 7: The method of Aspect 5, further comprising: exiting the acknowledgement assistance mode based on the value of the first retransmission metric for the assisting wireless device satisfying a threshold.

Aspect 8: The method of Aspect 5, further comprising: exiting the acknowledgement assistance mode based on a message, received from the sink wireless device, requesting that the assisting wireless device exit the acknowledgement assistance mode.

Aspect 9: The method of Aspect 5, further comprising: exiting the acknowledgement assistance mode based on detecting a threshold number of packet transmissions from the source device to the sink wireless device that are not acknowledged by the sink wireless device.

Aspect 10: A method of wireless communication performed by a sink wireless device, comprising: tracking a first retransmission metric that is based on a number of retransmitted packets that the sink wireless device received from a source device; transmitting, to an assisting wireless device, an acknowledgement assistance request indicating the first retransmission metric tracked by the sink wireless device; and receiving, from the assisting wireless device, a response to the acknowledgement assistance request based on respective values of the first retransmission metric tracked by the sink wireless device and a second retransmission metric tracked by the assisting wireless device.

Aspect 11: The method of Aspect 10, wherein the first retransmission metric and the second retransmission metric are moving averages that are based on the number of retransmitted packets, received from the source device over a time period, subsequent to an acknowledgement transmission to the source device.

Aspect 12: The method of any of Aspects 10-11, wherein the response is a rejection of the acknowledgement assistance request based on the value of the second retransmission metric being worse than the value of the first retransmission metric.

Aspect 13: The method of any of Aspects 10-12, wherein the response is an acceptance of the acknowledgement assistance request based on the value of the first retransmission metric being worse than the value of the second retransmission metric.

Aspect 14: The method of Aspect 13, further comprising: transmitting, to the assisting wireless device, a message requesting that the assisting wireless device exit an acknowledgement assistance mode based on an updated value of the first retransmission metric failing to satisfy a threshold.

Aspect 15: The method of Aspect 13, further comprising: receiving, from the source device, one or more retransmissions of a packet subsequent to transmitting a first acknowledgement for the packet; and transmitting a second acknowledgement for the packet based on a number of the one or more retransmissions of the packet satisfying a threshold.

Aspect 16: An apparatus for wireless communication at a device, comprising a processor; memory coupled with the processor; and instructions stored in the memory and executable by the processor to cause the apparatus to perform the method of one or more of Aspects 1-15.

Aspect 17: A device for wireless communication, comprising a memory and one or more processors coupled to the memory, the one or more processors configured to perform the method of one or more of Aspects 1-15.

Aspect 18: An apparatus for wireless communication, comprising at least one means for performing the method of one or more of Aspects 1-15.

Aspect 19: A non-transitory computer-readable medium storing code for wireless communication, the code comprising instructions executable by a processor to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by an assisting wireless device, comprising:
   tracking a first retransmission metric that is based on a number of retransmitted packets that the assisting wireless device received from a source device;
   receiving, from a sink wireless device, an acknowledgement assistance request indicating a second retransmission metric for the sink wireless device;
   transmitting, to the sink wireless device, a response to the acknowledgement assistance request based on respective values of the first retransmission metric and the second retransmission metric; and
   wherein the response is an acceptance of the acknowledgement assistance request based on the value of the second retransmission metric being worse than the value of the first retransmission metric.

2. The method of claim 1, wherein the first retransmission metric and the second retransmission metric are moving averages that are based on the number of retransmitted packets, received from the source device over a time period, subsequent to an acknowledgement transmission to the source device.

3. The method of claim 1, further comprising:
   operating in an acknowledgement assistance mode for the sink wireless device based on the acceptance of the acknowledgement assistance request.

4. The method of claim 3, wherein operating in the acknowledgement assistance mode for the sink wireless device includes:
   detecting a first acknowledgement transmitted by the sink wireless device for a packet transmitted from the source device to the sink wireless device; and
   transmitting, to the source device, a second acknowledgement for the packet based on detecting a retransmission of the packet from the source device to the sink wireless device subsequent to the first acknowledgement.

5. The method of claim 3, further comprising:
   exiting the acknowledgement assistance mode based on the value of the first retransmission metric for the assisting wireless device satisfying a threshold.

6. The method of claim 3, further comprising:
   exiting the acknowledgement assistance mode based on a message, received from the sink wireless device, requesting that the assisting wireless device exit the acknowledgement assistance mode.

7. The method of claim 3, further comprising:
   exiting the acknowledgement assistance mode based on detecting a threshold number of packet transmissions from the source device to the sink wireless device that are not acknowledged by the sink wireless device.

8. A method of wireless communication performed by a sink wireless device, comprising:
   tracking a first retransmission metric that is based on a number of retransmitted packets that the sink wireless device received from a source device;
   transmitting, to an assisting wireless device, an acknowledgement assistance request indicating the first retransmission metric tracked by the sink wireless device;
   receiving, from the assisting wireless device, a response to the acknowledgement assistance request based on respective values of the first retransmission metric tracked by the sink wireless device and a second retransmission metric tracked by the assisting wireless device; and
   wherein the response is an acceptance of the acknowledgement assistance request based on the value of the first retransmission metric being worse than the value of the second retransmission metric.

9. The method of claim 8, wherein the first retransmission metric and the second retransmission metric are moving averages that are based on the number of retransmitted packets, received from the source device over a time period, subsequent to an acknowledgement transmission to the source device.

10. The method of claim 8, further comprising:
    transmitting, to the assisting wireless device, a message requesting that the assisting wireless device exit an acknowledgement assistance mode based on an updated value of the first retransmission metric failing to satisfy a threshold.

11. The method of claim 8, further comprising:
receiving, from the source device, one or more retransmissions of a packet subsequent to transmitting a first acknowledgement for the packet; and
transmitting a second acknowledgement for the packet based on a number of the one or more retransmissions of the packet satisfying a threshold.

12. An assisting wireless device for wireless communication, comprising:
a memory; and
one or more processors, coupled to the memory, configured to:
track a first retransmission metric that is based on a number of retransmitted packets that the assisting wireless device received from a source device;
receive, from a sink wireless device, an acknowledgement assistance request indicating a second retransmission metric for the sink wireless device;
transmit, to the sink wireless device, a response to the acknowledgement assistance request based on respective values of the first retransmission metric and the second retransmission metric; and
wherein the response is an acceptance of the acknowledgement assistance request based on the value of the second retransmission metric being worse than the value of the first retransmission metric.

13. The assisting wireless device of claim 12, wherein the first retransmission metric and the second retransmission metric are moving averages that are based on the number of retransmitted packets, received from the source device over a time period, subsequent to an acknowledgement transmission to the source device.

14. The assisting wireless device of claim 12, wherein the one or more processors are further configured to:
operate in an acknowledgement assistance mode for the sink wireless device based on the acceptance of the acknowledgement assistance request.

15. The assisting wireless device of claim 14, wherein the one or more processors, to operate in the acknowledgement assistance mode for the sink wireless device, are configured to:
detect a first acknowledgement transmitted by the sink wireless device for a packet transmitted from the source device to the sink wireless device; and
transmit, to the source device, a second acknowledgement for the packet based on detecting a retransmission of the packet from the source device to the sink wireless device subsequent to the first acknowledgement.

16. The assisting wireless device of claim 14, wherein the one or more processors are further configured to:
exit the acknowledgement assistance mode based on the value of the first retransmission metric for the assisting wireless device satisfying a threshold.

17. The assisting wireless device of claim 14, wherein the one or more processors are further configured to:
exit the acknowledgement assistance mode based on a message, received from the sink wireless device, requesting that the assisting wireless device exit the acknowledgement assistance mode.

18. The assisting wireless device of claim 14, wherein the one or more processors are further configured to:
exit the acknowledgement assistance mode based on detecting a threshold number of packet transmissions from the source device to the sink wireless device that are not acknowledged by the sink wireless device.

19. A sink wireless device for wireless communication, comprising:
a memory; and
one or more processors, coupled to the memory, configured to:
track a first retransmission metric that is based on a number of retransmitted packets that the sink wireless device received from a source device;
transmit, to an assisting wireless device, an acknowledgement assistance request indicating the first retransmission metric tracked by the sink wireless device;
receive, from the assisting wireless device, a response to the acknowledgement assistance request based on respective values of the first retransmission metric tracked by the sink wireless device and a second retransmission metric tracked by the assisting wireless device; and
wherein the response is an acceptance of the acknowledgement assistance request based on the value of the first retransmission metric being worse than the value of the second retransmission metric.

20. The sink wireless device of claim 19, wherein the first retransmission metric and the second retransmission metric are moving averages that are based on the number of retransmitted packets, received from the source device over a time period, subsequent to an acknowledgement transmission to the source device.

21. The sink wireless device of claim 19, wherein the one or more processors are further configured to:
transmit, to the assisting wireless device, a message requesting that the assisting wireless device exit an acknowledgement assistance mode based on an updated value of the first retransmission metric failing to satisfy a threshold.

22. The sink wireless device of claim 19, wherein the one or more processors are further configured to:
receive, from the source device, one or more retransmissions of a packet subsequent to transmitting a first acknowledgement for the packet; and
transmit a second acknowledgement for the packet based on a number of the one or more retransmissions of the packet satisfying a threshold.

23. A non-transitory computer-readable medium storing a set of instructions for wireless communication, the set of instructions comprising:
one or more instructions that, when executed by one or more processors of an assisting wireless device, cause the assisting wireless device to:
track a first retransmission metric that is based on a number of retransmitted packets that the assisting wireless device received from a source device;
receive, from a sink wireless device, an acknowledgement assistance request indicating a second retransmission metric for the sink wireless device;
transmit, to the sink wireless device, a response to the acknowledgement assistance request based on respective values of the first retransmission metric and the second retransmission metric; and
wherein the response is an acceptance of the acknowledgement assistance request based on the value of the second retransmission metric being worse than the value of the first retransmission metric.

24. A non-transitory computer-readable medium storing a set of instructions for wireless communication, the set of instructions comprising:

one or more instructions that, when executed by one or more processors of a sink wireless device, cause the sink wireless device to:

track a first retransmission metric that is based on a number of retransmitted packets that the sink wireless device received from a source device;

transmit, to an assisting wireless device, an acknowledgement assistance request indicating the first retransmission metric tracked by the sink wireless device;

receive, from the assisting wireless device, a response to the acknowledgement assistance request based on respective values of the first retransmission metric tracked by the sink wireless device and a second retransmission metric tracked by the assisting wireless device; and wherein the response is an acceptance of the acknowledgement assistance request based on the value of the first retransmission metric being worse than the value of the second retransmission metric.

\* \* \* \* \*